(12) United States Patent
Jobert et al.

(10) Patent No.: US 12,152,976 B2
(45) Date of Patent: Nov. 26, 2024

(54) OPTICAL PARTICLE DETECTOR

(71) Applicant: COMMISSARIAT A L'ENERGIE ATOMIQUE ET AUX ENERGIES ALTERNATIVES, Paris (FR)

(72) Inventors: Gabriel Jobert, Grenoble (FR); Pierre Barritault, Grenoble (FR); Maryse Fournier, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 257 days.

(21) Appl. No.: 17/771,369

(22) PCT Filed: Oct. 21, 2020

(86) PCT No.: PCT/EP2020/079644
§ 371 (c)(1),
(2) Date: Apr. 22, 2022

(87) PCT Pub. No.: WO2021/078805
PCT Pub. Date: Apr. 29, 2021

(65) Prior Publication Data
US 2022/0381668 A1    Dec. 1, 2022

(30) Foreign Application Priority Data

Oct. 25, 2019   (FR) ...................................... 1911949

(51) Int. Cl.
*G01N 15/06*    (2024.01)
*G01N 15/0205*  (2024.01)
(Continued)

(52) U.S. Cl.
CPC ......... *G01N 15/06* (2013.01); *G01N 15/0211* (2013.01); *G01N 2015/0046* (2013.01); *G01N 15/075* (2024.01)

(58) Field of Classification Search
CPC .. G01N 15/06; G01N 15/0211; G01N 15/075; G01N 2015/0046; G01N 2015/0042; G01N 2015/0222
See application file for complete search history.

(56) References Cited

U.S. PATENT DOCUMENTS 5,101,113 A      3/1992  Hirleman, Jr. et al.
11,221,289 B2 *  1/2022  Jobert .................. G08B 17/107
(Continued)

FOREIGN PATENT DOCUMENTS

EP  3 477 277 A2   5/2019
FR  2 963 101 A1   1/2012
FR  3 062 209 A1   7/2018

OTHER PUBLICATIONS

International Search Report issued Dec. 9, 2020 in PCT/EP2020/079644 filed Oct. 21, 2020, 3 pages.
(Continued)

*Primary Examiner* — Jonathan M Hansen
(74) *Attorney, Agent, or Firm* — Oblon, McClelland, Maier & Neustadt, L.L.P.

(57) ABSTRACT

An optical particle detector is configured to simultaneously detect at least two particles within a useful detection volume. The detector includes a retina capable of receiving light rays scattered by the particles and a dark reticle interposed between the useful detection volume and the retina. The dark reticle includes at least one optical aperture allowing a passage towards the retina of a part of first scattered light rays and of a part of second scattered light rays, and an opaque surface on a periphery of the at least one aperture, preventing a passage towards the retina of another part of the first and second scattered light rays so as to project onto the retina first and second scattering diagrams separated from each other.

28 Claims, 22 Drawing Sheets

(51) Int. Cl.
  *G01N 15/00* (2006.01)
  *G01N 15/075* (2024.01)

(56) References Cited

U.S. PATENT DOCUMENTS

| | | | |
|---|---|---|---|
| 2004/0144935 A1* | 7/2004 | Xu | G01N 15/0211 |
| | | | 250/573 |
| 2012/0218379 A1* | 8/2012 | Ozcan | G03H 1/06 |
| | | | 348/40 |
| 2014/0152986 A1* | 6/2014 | Trainer | G01N 15/0211 |
| | | | 356/336 |
| 2014/0368820 A1* | 12/2014 | Sugasawa | G01N 15/0211 |
| | | | 356/336 |
| 2015/0116710 A1 | 4/2015 | Nicoletti | |
| 2016/0077218 A1 | 3/2016 | Loi et al. | |
| 2016/0202164 A1* | 7/2016 | Trainer | G01N 15/0211 |
| | | | 356/336 |
| 2019/0101482 A1* | 4/2019 | Allier | G01N 21/453 |
| 2019/0107496 A1 | 4/2019 | Fan et al. | |
| 2020/0033244 A1 | 1/2020 | Boutami et al. | |
| 2020/0033246 A1 | 1/2020 | Jobert | |
| 2022/0003660 A1* | 1/2022 | Kaiser | G01N 15/0211 |

OTHER PUBLICATIONS

Shu Wang, et al., "A Sauter mean diameter sensor for fire smoke detection," Sensors & Actuators: B. Chemical, vol. 281, 2019, 24 pages.

Gabriel Jobert, et al., "A miniaturized optical sensor for fire smoke detection," 2019 20th International Conference on Solid-State Sensors, Actuators and Microsystems & Eurosensors XXXIII (Transducers & Eurosensors XXXIII), 2019, 2 pages.

* cited by examiner

OPTICAL PARTICLE DETECTOR

TECHNICAL FIELD OF THE INVENTION

The present invention relates to the field of optical detection of particles in general and more particularly of particles of micrometric or even nanometric size. It finds for example for application the optical counting of particles and the angular analysis of the scattering of one or more particles.

Particularly advantageous, but non-limiting fields of application are for example: air quality control, detection of microbiological species, detection of powdered explosives, fire detection, alarm systems insensitive to false positives.

PRIOR ART

The particles are microscopic solid, liquid or wet solid objects suspended in the air. Their sizes vary from a few tens of nanometres to a few tens of micrometres. These particles come from various sources such as forest fires, construction sites, industrial sites, motor vehicles, etc.

When the concentration of these particles exceeds a certain threshold, they have a harmful impact on the environment and/or health. Thus, states have set maximum concentration thresholds. For example, the European Union allows maximum concentrations of 50 µg/m3 for particles of size comprised between 10 µm and 2.5 µm and 25 µg/m$^3$ for particles of size less than 2.5 µm.

It is therefore necessary to precisely detect the presence and concentration of these particles by size range.

Different particle detection methods exist, such as methods for detection by gravimetry, by ionisation, by beta attenuation, methods for detection by measuring aerodynamic mobility or electric mobility, optical detection methods.

The latter are advantageously simpler to implement, and more widespread.

Optical particle detectors are generally based on the detection of an interaction between light and particles. In practice, the particles to be detected pass through a zone illuminated by a light source. The intersection between the illuminated zone and the potential zone of presence of the particles is called the useful detection volume of the detector. This useful detection volume is comprised in the field of view of the detector. The useful detection volume may correspond to the illumination volume.

If particles are present in the useful detection volume, said particles will absorb part of the light which comes from the source and will deflect another part of this light outside the main direction of propagation, according to the scattering phenomenon.

A first optical detection method, called obscuration measurement, therefore consists in measuring the absorption of light through a cloud of particles or an accumulation of particles. This measurement allows to determine the concentration of the particles using the Beer-Lambert law if the composition of the cloud of particles is known a priori.

A second method consists in analysing the light scattered off the optical axis. The angular analysis of the scattered light is done from the recording of a scattering diagram. It is used to determine the shape, size, optical index and concentration of particles. For example, the size, the refractive index and the concentration can be determined from light scattering theories, for example Mie's theory (Ref: Bohren and Huffmann, Absorption and scattering of light by small particles, Ed. Wiley and Sons, 1983).

Optical particle counters operate on the principles mentioned above. They have the particularity that the useful detection volume is geometrically limited, for example by focusing a laser source and/or by a microfluidic channel and/or by a system of aerodynamic lenses. This geometric limitation of the useful detection volume allows to detect single particles rather than clouds.

A solution allowing to produce such optical particle counters or detectors while improving their robustness and reducing their cost consists in integrating these counters/detectors in miniaturised chips using technologies of microelectronics and photonics.

The document FR3062209 describes such an integrated detector. This detector comprises in particular a discrete assembly of photodetectors forming a retina as well as reflective surfaces to project onto the retina the image of the light scattered by the particle(s). A scattering diagram characteristic of the particle is thus obtained.

A disadvantage of this detector is that it does not allow to separate the scattering diagrams of several particles located simultaneously in the useful detection volume. Indeed, as illustrated in FIG. 1, when several particles $10_1$, $10_2$ are illuminated simultaneously in the useful detection volume 100, their respective scattering diagrams $S_1$, $S_2$ formed on the retina 20 are superposed to form a total scattering diagram $S_{tot}$ which is unresolved. This superposition is therefore at the origin of a loss of information on the individual diagrams $S_1$, $S_2$. It then becomes difficult to discern the individual optical and geometric properties of the particles, to estimate the individual positions of the particles and, ultimately, to count the particles.

FIG. 2A shows a simulation of an image formed on the retina of such a detector, by illuminating a spherical particle 5 µm in diameter. This image allows to easily determine the scattering diagram of this particle.

FIG. 2B shows a simulation of an image formed on the retina of such a detector, by simultaneously illuminating three spherical particles of 1 µm, 2 µm and 5 µm in diameter respectively. This image does not allow to differentiate the scattering diagrams of each of the particles.

The angular analysis performed by such a detector is therefore not adapted for the simultaneous detection of several particles.

Furthermore, the light intensity associated with the scattering of the particles with the largest diameters is much higher than the light intensity associated with the scattering of the particles with the smallest diameters. In this case, the scattering diagram of a large-diameter particle can blind that of a small-diameter particle. The comparison of FIGS. 2A, 2B illustrates this problem of blinding the detector by the scattering diagram of the particle of larger diameter.

Another disadvantage of the detector described by document FR3062209 is therefore the difficulty of detecting small-diameter particles in the presence of large-diameter particles. Reliable detection of these small-diameter particles is an important issue since these small-diameter particles are generally the most dangerous to health.

A known solution allowing to avoid the analysis of multiple simultaneous scatterings is to reduce the useful detection volume, for example by reducing the section of the light beam emitted by the source. By geometrically limiting the particle/light interaction zone, the probability of occurrence of simultaneous multiple scattering is reduced. However, by reducing the effective detection volume, the probability of a particle being illuminated by the beam is also reduced. The detection sensitivity of the detector is then reduced.

To overcome this reduction in detection sensitivity, it is possible to guide the flow of particles towards the reduced useful volume, for example by using a fluidic channel of small section or by means of an aerodynamic lens.

In this case, however, the fluidic response time of the detector is considerably lengthened. This fluidic response time corresponds to the time required for a particle to traverse the fluidic channel and be detected. A too long response time is particularly detrimental for alarm system applications.

A possibility to reduce this response time is to use an additional system to force the convection of the flow, for example a fluidic pump or a fan. The complexity and the cost of such a miniature detector is then increased considerably.

Another solution allowing to avoid the analysis of multiple simultaneous scatterings is to carry out a step of preliminary dilution of the flow of particles, before their passage in the useful detection volume. The flow of particles to be analysed can thus be mixed with a previously filtered air flow. This solution also complicates the detector and reduces its sensitivity.

There is therefore a need consisting in reducing or even eliminating at least some of the disadvantages that the detectors of the prior art have. An object of the present invention is to meet this need.

Another objective of the present invention consists in proposing a solution allowing to discern scattering diagrams which come from multiple and simultaneous scatterings.

Another objective of the present invention consists in proposing a solution allowing to analyse each of said scattering diagrams individually, so as to determine individual optical (for example refractive index) and/or geometric properties (for example diameter) of the particles.

SUMMARY OF THE INVENTION

To achieve these objectives, the present invention proposes an optical particle detector intended to simultaneously detect at least one first particle and at least one second particle within a useful detection volume intended to accommodate a fluid transporting particles and to be traversed by incident light rays emitted by at least one primary source, said first and second particles respectively forming first and second secondary sources emitting respectively, when they are located in the useful detection volume and when they scatter a part of the incident light rays, the first scattered light rays and the second scattered light rays. This detector comprises a retina formed by a plurality of photodetectors capable of receiving scattered light rays.

Advantageously, this detector further comprises at least one reticle interposed between the useful detection volume and the retina, and this reticle comprises:
  at least one optical passage zone allowing a passage towards the retina of a part of the first scattered light rays (called the first scattered part) and of a part of the second scattered light rays (called the second scattered part), and
  at least one optical blocking zone preventing a passage towards the retina of a part of the first scattered light rays (called the first blocked part) and of a part of the second scattered light rays (called the second blocked part).
Preferably, said at least one passage zone:
  is separated from the retina by a minimum distance Z taken along an optical axis (O) normal to the retina, that is to say an axis normal to a plane wherein mainly extends a face of the retina facing the reticle if the retina is flat,
  further has at least one dimension a taken in a direction transverse to the optical axis.

According to an optional embodiment, the reticle and the retina are configured, in particular the minimum distance Z and the dimension a, so that the first scattered part is received by a first set of photodetectors whose distribution delimits on the retina a first figure taken from a spot and a shadow, the second scattered part is received by a second set of photodetectors, the distribution of which delimits on the retina a second figure taken from a spot and a shadow, said second figure being at least partly distinct from the first figure when the first and second parts passing through the at least one optical passage zone together define an angle $\theta_{ij}$ whose value is at least equal to an angular resolution $\delta\theta$ of the detector.

If there is a plurality of particles in the useful volume, the above definition applies for each pair of particles belonging to this plurality of particles.

For each scattering particle, the scattering diagram received by the photodetectors is for example derived from the convolution product of the scattering diagram of the particle by the figure (spot or shadow) projected onto the retina through the reticle.

The reticle may be dark. In this case, it blocks a majority of the rays scattered by the scattering particle in question and projects onto the retina a scattered part in the shape of a spot, through the at least one optical passage zone also called optical aperture. The surface occupied by the at least in the optical blocking zone is greater than the surface occupied by the at least in the optical passage zone. Thus in this case the figure formed on the retina is a spot.

With a dark reticle, spots are easily discernible. Indeed this type of reticle limits the superposition of the signatures of each particle which scatters. Moreover, this type of reticle offers a very good contrast. Furthermore, the signature analysis is possible on almost the entire spot even if there are more than three particles.

The reticle may be clear. In this case, it allows a majority of the rays scattered by the scattering particle in question to pass and projects a shadow onto the retina formed by at least one optical blocking zone, also called the opaque surface. The surface occupied by the at least in the optical passage zone is greater than the surface occupied by the at least in the optical blocking zone. Thus in this case the figure formed on the retina is a shadow.

With a clear reticle, the analysis surface is very large. The projected shadow gives accurate and easily identifiable information on the position information.

In order to combine the advantages of dark and clear reticles, provision can also be made for the reticle to have portions wherein the optical passage zones occupy a larger surface than that of the optical blocking zones and other portions wherein the optical blocking zones occupy a larger surface than that of the optical passage zones.

The reticle of this detector is therefore configured to filter the first and second light rays scattered respectively by the first and second particles, before receiving the rays scattered by the retina. This allows in particular to avoid, at least in part, superposing these first and second scattered light rays on the retina. This also prevents blinding the retina, since not all of the first and second scattered light rays reach the retina. In the case of a dark reticle comprising one or more optical apertures, this also allows to prevent other rays, coming for example from parasitic scatterings, from reaching the retina. This detector thus has a reduced sensitivity to parasitic scatterings.

Indeed, within the framework of the development of the present invention, it turned out that the miniaturised detectors known from the prior art have disadvantages relating to parasitic scatterings of the source beam on the various elements of the detector. In these known detectors, as the source beam is several orders of magnitude brighter than the light scattered by the particles, the parasitic scatterings can be enough to noisy or even blind the retina, which makes angular analysis difficult or even impossible. Parasitic scatterings are less of a problem for large detectors (that is to say centimetric in size), because the different scattering elements are farther from the retina and are generally out of the field of view of the detector.

With the detector according to the present invention, after filtration by the dark reticle, the retina thus receives only the first and second scattered parts.

By cutting off part of the first and second scattered light rays, the probability that the first and second scattered parts are superposed on the retina decreases. In particular, during the passage of the first and second particles in the useful detection volume, there are necessarily positions of these particles within the useful detection volume for which the first and second scattered parts are not superposed on the retina. It is thus possible to separate the first and second scattering diagrams formed respectively by the first and second scattered parts received simultaneously by the retina.

As illustrated in FIG. 3 and contrary to the device illustrated in FIG. 1, only the first 31 and second 32 scattered parts contribute respectively to the formation of a first and a second scattering diagram $S_1$, $S_2$ on the retina 20. The first scattering diagram $S_1$ therefore corresponds to a sampling of the complete scattering diagram of the first particle $10_1$. In the same way, the second scattering diagram $S_2$ corresponds to a sampling of the complete scattering diagram of the second particle $10_2$. The dark reticle 30 advantageously allows to perform such sampling, by filtering the first and second scattered light rays $kd_1$, $kd_2$. In particular, the complete scattering diagram of the first particle $10_1$ is mainly sampled according to an angle $\theta_j$ between the scattered rays $kd_1$ of the first scattered part 31 and the optical axis O. The complete scattering diagram of the second particle $10_2$ is mainly sampled at an angle $\theta_i$ between the scattered rays $kd_2$ of the second scattered part 32 and the optical axis O. The optical axis O is perpendicular to the retina 20 is more precisely perpendicular to the face of the retina 20 facing the dark reticle 30.

Consequently, the dark reticle 30 allows to spatially separate the scattering diagrams $S_1$, $S_2$ on the retina 20. As illustrated in FIG. 3, the position of the light peak peak forming the first scattering diagram $S_1(\theta_j)$ is directly related to the angle $\theta_j$ under which the first particle $10_1$ is seen through the at least one aperture 301 of the dark reticle 30. In the same way, the position of the light peak $S_{1peak}$ forming the second scattering diagram $S_2(\theta_i)$ is directly related to the angle $\theta_i$ under which the second particle $10_2$ is seen through the at least one aperture 301 of the dark reticle 30. Consequently, two particles $10_1$, $10_2$ located at different positions within the useful detection volume 100 project light peaks $S_{1peak}$, $S_{2peak}$ at different positions on the retina 20. The light peaks $S_{1peak}$, $S_{2peak}$ are thus separated on the retina 20, at their tops by a separation distance $L_{Tops}$ and at their bases by a separation distance $L_{Bases}$.

More specifically, $L_{Bases}$ corresponds to the smallest distance between the base $BS_1$ formed by the peak $S_{1peak}$ and the base $BS_2$ formed by the peak $S_{2peak}$. It is not the distance between the tops $SS_1$ and $SS_2$ of these peaks $S_{1peak}$, $S_{2peak}$, $BS_1$, $BS_2$, $SS_2$ and $SS_2$ are referenced in FIG. 3. A peak can have a general cone shape (for example when the aperture is a pinhole). Alternatively, a peak can also have a shape which extends along a rectilinear curve (case of an aperture or optical passage zone forming a rectilinear slot) or according to a curvilinear curve (case of an aperture or optical passage zone forming a curved slot or a closed contour). The distance $L_{Bases}$ then corresponds to the smallest distance between two adjacent peaks belonging to the diagrams projected by two particles and corresponding to identical zones of the aperture. $L_{Bases}$ is measured on the face of the retina 20 on which the first 31 and second 32 scattered parts arrive.

Advantageously, the at least one optical passage zone is furthermore configured so that this separation between the first and second scattering diagrams $S_1$, $S_2$ is sufficiently resolved on the retina 20, that is to say that it corresponds to a separation distance Ls between the spots T1, T2, or a distance $L_{Bases}$ between the bases of the peaks of the light diagrams or a distance $L_{Tops}$ between the tops of the peaks of the light diagrams, greater than or equal to K times a pitch Lpix between two adjacent photodetectors of the retina 20, with K=2, preferably K=5, preferably K=10, preferably K=20.

The pitch Lpix is measured in a plane parallel to a face of the retina 20 facing the dark reticle 30 if the retina is flat. The pitch Lpix corresponds to the smallest distance between the centres of two adjacent photodetectors.

The at least one passage zone is preferably dimensioned according to the separation distance $L_S$ and the desired angular resolution $\delta\theta$ of the detector, for example $\delta\theta$ of the order of 2°. In particular, the dimension a of the at least one passage zone is such that, $a=(Z\cdot\tan(\delta\theta)-L_s)Z_p/Z+Z_p$ where Zp is the minimum distance separating the useful detection volume of the at least one passage zone, along the optical axis O. This dimension a therefore also depends on the distances Z and Zp which determine an overall depth of the detector along its optical axis O. The dimension a can alternatively be dimensioned according to the separation distance $L_{Tops}$ or the separation distance $L_{Bases}$. It suffices in this case to replace Ls by $L_{Tops}$ or $L_{Bases}$ in the above formula.

Preferably but optionally, the detector has a field of view defined by an angle FOV=a tan(L/2z) where L is a lateral dimension of the retina taken in a plane parallel to a face of the retina facing the dark reticle if the retina is flat, Z being the distance separating the dark reticle from the retina, and the useful detection volume is comprised in this field of view. The field of view has a top extending from the at least one aperture and an axis of symmetry parallel to the optical axis. The useful detection volume of this detector can thus be significantly increased, and have for example a diameter of 100 μm to 2 mm. Furthermore, the entire useful detection volume can be projected onto the retina through the at least one aperture. The detection sensitivity of the detector is improved.

This detector thus has detection sensitivity and a useful detection volume greater than existing miniaturised detectors, while maintaining a simple and inexpensive design, and a short fluidic response time.

Thus, the present invention proposes an effective solution for improving current detectors. It proposes a miniaturised optical particle detector allowing to discern scattering diagrams which come from multiple and simultaneous scatterings. Preferably, this detector further allows to analyse each of said scattering diagrams individually, so as to determine the optical (for example refractive index) and geometric (for example diameter) properties of the individual particles. Preferably, this detector also has good detection sensitivity and/or a shortened fluidic response time. Preferably, this detector also allows to analyse a large useful detection volume (for example having a diameter of 100 µm to 2 mm).

The present invention also relates to a system comprising such a detector, and the at least one primary source.

According to an optional embodiment, the at least one primary source comprises a first primary source emitting incident light rays having at least one first wavelength and a second primary source emitting incident light rays having at least one second wavelength different from the first wavelength, said first and second primary sources having respectively first and second main emission directions configured to intersect within the useful detection volume. This system advantageously allows to produce polychromatic images of the scattering diagrams.

The present invention also relates to a method for manufacturing such a particle detector, comprising at least the following steps:
  providing an optically transparent block having a first face and a second face opposite the first face,
  depositing on the first side an opaque or reflective coating, for example a carbon or metallic layer,
  optionally, piercing the transparent block in a direction substantially normal to the first and second faces, for example by laser etching or deep wet etching or else RIE (reactive ion etching) type etching, so as to produce a through fluidic channel,
  forming at least one aperture in the coating at said at least one pattern, for example by etching, so as to produce a dark reticle comprising said opaque or reflective coating and said at least one aperture. For example, forming at least one pinhole or slot pattern on the coating of the first face, for example by lithography or by deposition.
  optionally, depositing an opaque layer on the surfaces of the block substantially normal to the first and second faces, for example by spraying paint,
  Assembling, for example by gluing, the block and a retina comprising a plurality of photodetectors, at the second face of the block.

BRIEF DESCRIPTION OF FIGURES

The aims, objects, as well as the features and advantages of the invention will emerge better from the detailed description of embodiments of the latter which are illustrated by the following accompanying drawings wherein.

Figure 1:
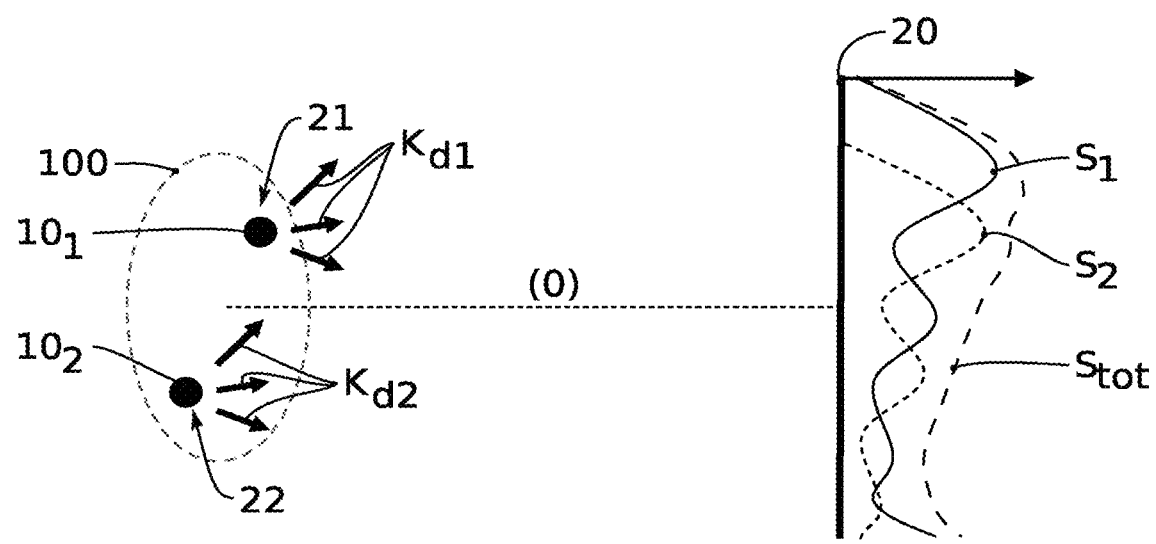
FIG. 1 schematically illustrates a detector in section and the scattering diagrams of two particles formed on the retina of this detector according to the prior art.
Figure 2A:
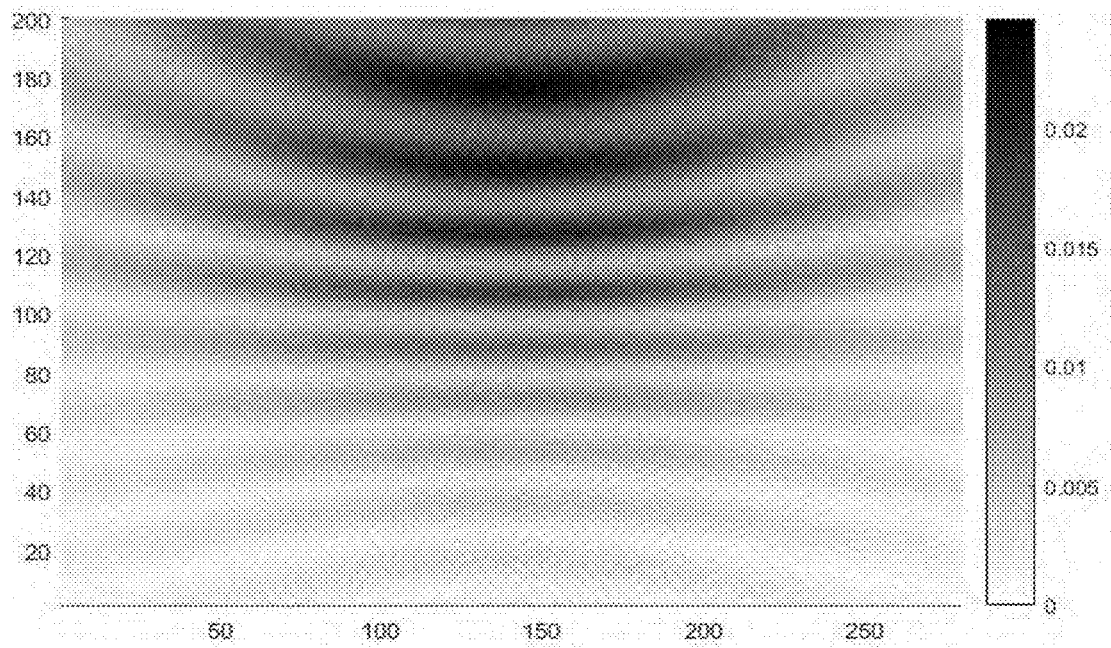
FIG. 2A shows a simulation of an image formed on the retina of the detector of the prior art illustrated in FIG. 1, from the scattering of a spherical particle 5 µm in diameter.
Figure 2B:
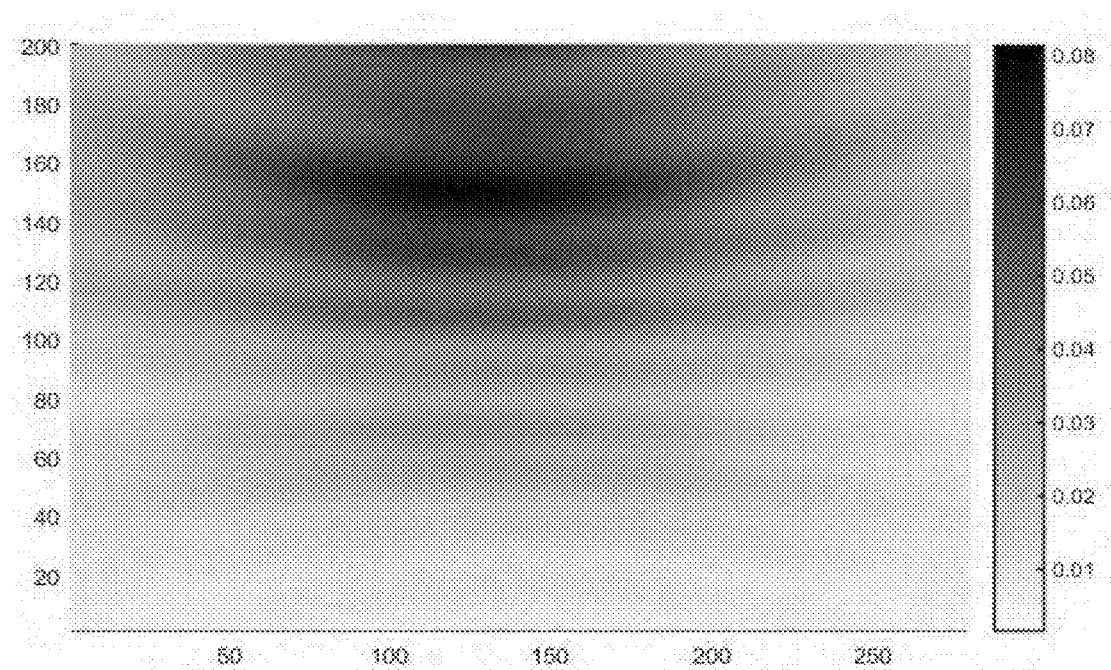
FIG. 2B shows a simulation of an image formed on the retina of the detector of the prior art illustrated in FIG. 1, from the simultaneous scattering of three spherical particles 1 µm, 2 µm and 5 µm in diameter respectively.

The drawings are given by way of examples and do not limit the invention. They constitute schematic principle representations intended to facilitate the understanding of the invention and are not necessarily scaled to practical applications. In particular the dimensions of the different structures (particles, reticle, retina) are not representative of reality.

DETAILED DESCRIPTION OF THE INVENTION

Before starting a detailed review of embodiments of the invention, it is recalled that, optionally, the invention comprises at least any one of the following optional features which can be used in combination or alternatively.

According to an optional embodiment, the second figure is offset on the retina with respect to the first figure. According to an optional embodiment, the smallest distance Ls corresponding to this offset between these two figures is greater than or equal to 2*Lpix when the first and second parts passing through the at least one optical passage zone together define an angle $\theta_i$ whose value is at least equal to an angular resolution $\delta\theta$ of the detector, Lpix being the pitch between two adjacent photodetectors of the retina.

According to an exemplary embodiment, the distance Ls between the figures projected onto the retina is non-zero. The photodetectors of the retina 30 pick up light rays scattered by only one of the particles $10_1$, $10_2$. In other words, the same photodetector does not pick up the rays scattered by more than one particle. In this way, blinding the photodetectors or superposing the diagrams on one of the photodetectors will be avoided.

According to an optional embodiment, the dimension a is configured so that $$a = (Z.\tan(\delta\theta) - L_s)\frac{Z_p}{Z + Z_p}$$

where Zp is the minimum distance separating the useful detection volume from at least one of said optical passage and blocking zones.

According to an optional embodiment, the reticle and the retina are configured, in particular the minimum distance Z and the dimension a, so as to generate on the retina a first scattering diagram S1 formed by the first scattered part, and a second scattering diagram S2 formed by the second scattered part.

According to an exemplary embodiment, said first and second scattering diagrams S1, S2 are distinct. They are offset.

According to an exemplary embodiment, said first and second scattering diagrams S1, S2 are distinct when the first and second parts passing through the at least one optical passage zone together define an angle $\theta_{ij}$ whose value is at least equal to an angular resolution $\delta\theta$ of the detector, Lpix being the pitch between two adjacent photodetectors of the retina.

According to an exemplary embodiment, said first and second scattering diagrams S1, S2 each form at least one light peak $S_{peak}$, $S_{2peak}$. These light peaks $S_{1peak}$, $S_{2peak}$ are distinct. They are offset.

According to one embodiment, said first and second scattering diagrams S1, S2 each form at least one light peak $S_{peak}$, $S_{2peak}$ corresponding to at least one optical passage zone and each having a base $BS_1$, $BS_2$. The bases $BS_1$, $BS_2$ of each scattering diagram S1, S2 are offset on the retina by a separation distance $L_{Bases} \geq 2*Lpix$ when the first and second parts passing through the at least one optical passage zone together define an angle $\theta_{ij}$ whose value is at least equal to an angular resolution $\delta\theta$ of the detector, Lpix being the pitch between two adjacent photodetectors of the retina. Preferably, $L_{Bases} \geq 5*Lpix$. Preferably, $L_{Bases} \geq 10*Lpix$. Preferably, the peak $S_{1peak}$, $S_{2peak}$ of each diagram comprises at least one top $SS_1$, $SS_2$, the highest point of the base $BS_1$, $BS_2$ being located at a height of the peak $S_{1peak}$, $S_{2peak}$ equal to 10% of the height $HS_1$, $HS_2$ of the top $SS_1$, $SS_2$, and preferably located at a height of the peak $S_{1peak}$, $S_{2peak}$ equal to 5% of the height of the top $SS_1$, $SS_2$. The distance $L_{Bases}$ is measured at the highest point of the base $BS_1$, $BS_2$. Thus, it is possible that two adjacent peaks overlap in zones located under the bases (partial covering of the spots). These zones have low light intensities. However, at the bases, the diagrams do not overlap.

According to one embodiment, said first and second scattering diagrams S1, S2 each form at least one light peak $S_{1peak}$, $S_{2peak}$ corresponding to at least one optical passage zone and having a top $SS_1$, $SS_2$. The tops $SS_1$, $SS_2$ of each scattering diagram S1, S2 are offset on the retina by a separation distance $L_{Tops} \geq 10*Lpix$ when the first and second parts passing through the at least one optical passage zone together define an angle $\theta_{ij}$ whose value is at least equal to an angular resolution $\delta\theta$ of the detector, Lpix being the pitch between two adjacent photodetectors of the retina. Preferably, $L_{Tops} \geq 20*Lpix$.

If there is a plurality of particles in the useful volume, the above definitions apply for each pair of particles belonging to this plurality of particles. Indeed if there is a plurality of particles there is a plurality of spots and a plurality of scattering diagrams.

According to one embodiment, the first and second shadows B1, B2 formed on the retina by the at least one optical blocking zone are distinct. They are offset.

According to one embodiment, the first and second shadows B1, B2 are partially superposed on the retina.

According to one example, the optical passage zone forms at least one aperture delimited by the optical blocking zone, the first figure and the second figure each being a spot (or lighted spot). The optical passage zone is thus surrounded, preferably entirely, by the optical blocking zone. The contour of the optical passage zone is defined or consists, preferably entirely, of the optical blocking zone.

According to one example, the optical passage zone forms at least one aperture surrounding, preferably entirely, the optical blocking zone, the first figure and the second figure each being a shadow. The optical blocking zone is thus surrounded, preferably entirely, by the optical passage zone. The contour of the optical blocking zone is defined or consists, preferably entirely, of the optical passage zone.

According to one example, the at least one optical passage zone comprises at least one pattern from a pinhole and a slot. The pinhole pattern allows to project a spot onto the retina for each of the scattering particles. This spot forms the scattering diagram $S(\theta_j)$ of the scattering particle in question and corresponds to the only light rays scattered by this particle passing through the pinhole and substantially forming a scattering angle $\theta_j$ with the optical axis. This allows the scattering diagrams of different particles to be limited to easily discernible spots on the retina. The slot pattern allows to project a line for each of the scattering particles onto the retina. This line forms the scattering diagram $S(\theta_i \ldots \theta_j)$ of the scattering particle in question and corresponds only to the light rays scattered by this particle passing through the slot and substantially forming a scattering angle comprised in the interval of angles $[\theta_i \ldots \theta_j]$ relative to the optical axis. This allows to obtain a scattering diagram carrying more information on the scattering particle.

According to one example, the at least one optical passage zone comprises at least one pinhole pattern and at least one slot pattern, said patterns being partly superposed. This allows to facilitate reading the pattern projected onto the retina, for example by using a shape recognition algorithm. The combination of the circular shape of the pinhole and the rectilinear or curvilinear shape of the slot is thus easily discernible on the retina.

According to one example, the at least one pinhole pattern has a diameter approximately twice greater than a width of the at least one slot pattern, said width being taken in a direction normal to the tangent to the slot at the point in question.

According to one example, the at least one slot pattern is straight or curved.

According to one example, the at least one optical passage zone comprises a plurality of pinhole patterns. These pinhole patterns can be interconnected, for example by one or more slots, so as to form an optical passage zone. These pinhole patterns can be separated from each other, so as to form several apertures or optical passage zones. A plurality of pinhole patterns allows to project a plurality of corresponding spots onto the retina, for each of the scattering particles. According to the principle of the reversibility of light, it is thus possible to estimate the position of a given scattering particle, from the positions of the spots on the retina and the angles that said spots form with respect to the axes passing through the corresponding pinholes and parallel to the optical axis. For example, two spots obtained through a double pinhole allow to trace two "return" rays which intersect at the estimated position of the scattering particle. In the case of an optical passage zone comprising N pinholes (for example N comprised in 2 and 10), it is possible to cross 2 among N rays $$\binom{N}{2}$$

and therefore to estimate a position of the scattering particle averaged from $$\binom{N}{2}$$

values.

The use of N pinholes thus allows to carry out an accurate estimation of the position of the particle. This allows to obtain a scattering diagram sampled over N scattering angles. This allows for example to perform an improved theory/measurement comparative analysis of the scattering diagram. The analysis of the nature of the particle is thus improved.

According to one example, the optical passage zone comprises at least one curved slot pattern having a negative curvature directed towards a centre of the reticle. Such a pattern allows to compensate for a positive curvature induced by a medium of thickness Z comprised between the reticle and the retina having a refractive index greater than that where the particle is located. This medium indeed deforms the scattering diagram projected onto the retina through the slot.

A curvature opposite to this deformation thus allows to "straighten" the scattering diagram, and allows, for example, to obtain a scattering diagram in the shape of a line on the retina. This makes it easier to read the scattering diagram.

According to one example, the optical passage zone comprises at least one curved slot pattern having a positive curvature directed towards a periphery of the reticle.

According to one example, the slot pattern forms a closed contour.

According to one example, the closed contour is a ring. This favours the observation of Mie alternations, which appear as lobes in the scattering diagram, according to Mie theory.

According to one example, the closed contour is an ellipse. This allows to optimise the observation of Mie alternations, in the case where the incident rays illuminating a given particle are substantially parallel to the plane wherein the reticle extends.

According to one example, the at least one optical passage zone comprises a plurality of optical passage zones each having at least one pattern taken from a pinhole and a slot. This makes it easier to read the pattern projected onto the retina and improves recognition of the scattering diagram. This also allows to obtain a richer scattering diagram, that is to say carrying more information on the scattering particle. At least some of these apertures or optical passage zones may be distinct, that is to say separated from each other or, on the contrary, overlap, intersect or touch each other.

According to one example, the at least one optical passage zone has a characteristic size a such that $a \geq 10 \cdot Lpix \cdot (Z/(Z+Zp))$, where Zp is the minimum distance separating the useful detection volume from at least part of said optical passage and blocking zones and Lpix is the pitch between two adjacent photodetectors.

According to one example, the at least one optical passage zone has a passage surface $S_a$ of less than 50% of the total surface of the reticle, preferably less than 10% of the total surface of the reticle. This allows to obtain good readability of the scattering diagram. This allows to increase the probability of avoiding a superposition of the scattering diagrams of several particles simultaneously present in the useful detection volume.

According to one example, the angular resolution $\delta\theta$ of the detector is of the order of 2°.

According to one example, the minimum distance $Z_p$ separating the useful detection volume from at least one of said optical passage and blocking zones is such that $0.2 \cdot Z \leq Z_p \leq 2 \cdot Z$.

According to one example, all the photodetectors have the same dimensions. In particular, they all have the same width.

According to one example, the detector further comprises at least one fluidic channel intended to guide the particles towards the useful detection volume, the channel passing through the reticle at an orifice formed in the reticle. This allows to improve the detection sensitivity of the detector while preserving good compactness of the detector and a small space requirement.

According to one example, the at least one optical passage zone comprises a plurality of optical passage zones distributed around the orifice. Such a distribution allows to differentiate analysis zones, for example a front scattering zone filtering and receiving scattered rays propagating in the direction of the incident rays and a backscattering zone filtering and receiving backscattered rays propagating in a direction opposite to that of the incident rays.

According to one example, the plurality of optical passage zones comprises at least one first optical passage zone and at least one second optical passage zone located on either side of the orifice of the channel, said at least one first optical passage zone having a lower characteristic dimension, preferably at least twice less than a characteristic dimension of the at least one second optical passage zone. Such a first optical passage zone is for example adapted to the front scattering zone of the detector, which is brighter. The use of fine and resolved patterns for this first optical passage zone associated with the front scattering zone allows to form a first proportionally fine and resolved scattering diagram. Such a second optical passage zone is for example adapted to the backscattering zone of the detector, which is less bright. The use of wide patterns for this second optical passage zone associated with the backscattering zone allows to improve the detection sensitivity of the backscattered rays, in order to obtain a second backscattering diagram.

According to one example, the plurality of photodetectors of the retina comprises at least one first zone of photodetectors adapted to receive first and second scattered parts through the at least one first optical passage zone, and at least one second zone of photodetectors adapted to receive first and second parts scattered through the at least one second optical passage zone, the first zone of photodetectors comprising photodetectors different from those of the second zone of photodetectors.

According to one example, the first zone of photodetectors comprises smaller and more numerous photodetectors than those of the second zone of photodetectors. This improves the resolution of the retina at the first zone. According to one example, the first zone of photodetectors comprises a higher density of photodetectors than that of the second zone of photodetectors.

According to one example, the second zone of photodetectors comprises more sensitive photodetectors than those of the first zone of photodetectors. For example, the photodetectors of the second zone of photodetectors have a larger size, and/or a higher gain than those of the first zone. This improves the sensitivity of the retina in the second zone.

According to one example, the detector further comprises opaque walls connecting the reticle and the retina and forming at least one closed contour so as to define a dark room wherein the first and second scattered parts propagate. This dark room is only optically open at the at least one optical passage zone of the reticle. This dark room limits the illumination of the retina. This reduces the probability that other rays, for example from parasitic scattering, will penetrate the dark room and disturb the image formed on the retina.

According to one example, the internal surfaces of the walls of this dark room are absorbent.

According to one example, the detector further comprises at least one first chromatic filter configured to filter the first and second scattered parts having a first wavelength, and at least one second chromatic filter configured to filter the first and second scattered parts having a second wavelength different from the first wavelength. The first and second chromatic filters can for example be disposed respectively at a first and a second optical passage zone. Alternatively or in combination, the chromatic filters can be disposed respectively at a first and a second pattern of the same optical passage zone. Thus, the pattern specifically filters one colour of the illumination, and the scattering diagram projected onto the retina can be formed by different chromatic parts. Alternatively, the first and second chromatic filters can for example be disposed respectively at a first and a second zone of photodetectors. According to another example, the detector comprises three chromatic filters (typically red, green, blue) deposited on three zones of photodetectors of the retina. It is thus possible to obtain three images which correspond to the scattering diagrams relating to the three colours.

According to one example, the optical detector does not comprise a lens, at least no converging lens, between the reticle and the retina. Thus and advantageously, no converging lens is required for the detector. The absence of such lenses allows to improve the compactness of the detector. This also allows to improve the robustness and/or reliability of the detector.

According to one example, in the system according to the invention, the first and second main emission directions of the first and second primary sources are non-collinear and form an angle $\alpha$ therebetween.

According to another example, in the system according to the invention, the first and second main directions of emission of the first and second primary sources are collinear and the first and second incident light rays propagate in opposite directions.

According to one example, the system comprises a third source emitting third incident light rays having at least one third wavelength different from the first and second wavelengths, and the third primary source has a third main direction of emission configured to cross the first and second main emission directions within the useful detection volume. The first, second and third wavelengths are preferably taken from red, green, blue and near infrared, and the detector comprises three chromatic filters filtering three colours preferably taken from red, green, blue and near infrared.

The present invention finds as its preferred field of application the detection of particles of various sizes, preferably in the field of microscopic or even nanometric particles. For example, the present invention can be used to detect particles from smoke, explosive powder, polluting particles, dust particles, allergen particles such as pollen, mould spores, or else carcinogenic particles, or biological particles such as bacteria, viruses, or else exosomes.

The present invention applies to any type of particles conveyed by a fluid, whether the latter is liquid and/or gas.

The fluid present or flowing in the useful detection volume is, for example, air. This is the case for the detectors integrated in the following systems: a fire alarm system, a fire detection system, an explosive powder detection system, a system for analysing the quality of a fluid such as air, an anti-pollution alarm system.

Alternatively, the fluid can be a liquid such as water. This is the case for detectors integrated in systems for detecting microbiological species.

The present invention aims in particular at simultaneously producing scattering diagrams of several particles, within a detector manufactured using conventional micro-manufacturing technologies. It is understood that this detector can, if necessary, produce a scattering diagram of a single particle.

In the context of the present invention, the term "particle" or its equivalents is defined as a constituent of a physical system considered elementary with respect to the properties studied.

The term particle refers in particular to a solid, liquid or wet solid object suspended in a fluid such as air and whose size is microscopic. For example, a particle is an element of matter whose largest dimension is less than a few millimetres ($10^{-3}$ metres), preferably less than one millimetre, and preferably less than a few tens of micrometres ($10^{-6}$ metres) and preferably less than a micrometre, or even of the order of a nanometre ($10^{-9}$ m). More generally, the particles have a size greater than 40 Å ($10^{-10}$ m) and are therefore considered to be optically continuous. In general, these are objects composed of matter whose dimensions are small compared to the dimensions of the cavity or the channel for the circulation of particles.

"Size" or "diameter" of a particle means the maximum distance between two points of the particle. Typically, a particle is assimilated to an object of spherical geometry, its size therefore corresponds to the diameter of the sphere.

In what follows, the term "absorption" or its equivalents refers to the phenomenon by which the energy of an electromagnetic wave is transformed into another form of energy, for example by heat dissipation. In the present description, a material is considered to be absorbent when it absorbs at least 50% of light radiation, preferably at least 75% and advantageously at least 90%. It can be characterised by an absorption factor comprised between 0 and 1.

In what follows, the term "scattering" or its equivalents refers to the phenomenon by which a propagation medium produces a distribution, in many directions, of the energy of an electromagnetic wave, an electromagnetic light wave for example.

In what follows, the term "reflection" or its equivalents refers to the phenomenon of re-emission from an element or a surface of incident light radiation. In the present description, an element is considered to be reflective when it re-emits at least part of incident light radiation, this part being greater than or equal to 50%. It can be characterised by a reflection factor comprised between 0 and 1.

The detector according to the invention comprises a "reticle". This reticle denotes a surface comprising at least one optical passage zone, which is preferably transparent, and at least one optical blocking zone, which is preferably opaque. In the rest of the description, the optical passage zone of the reticle is also designated by the terms "transparent surface", "optical aperture" or "aperture", for the sake of brevity. These denominations are equivalent and designate an interface, a surface or a volume through which light rays can pass. The optical aperture can be a physical aperture formed of air or vacuum or be filled with a transparent material. In the following, the optical blocking zone of the reticle is designated by the terms "opaque surface". These denominations are equivalent and designate an interface, a surface or a volume through which light rays are blocked.

A surface is called "opaque" surface when it is not traversed by light radiation of a given wavelength or when it is traversed by less than 10% and preferably by less than 5% of this light radiation. This radiation is for example absorbed by the opaque surface. Alternatively, this radiation may be specularly reflected or scattered by the opaque surface. These three phenomena are not mutually exclusive.

The opaque surface can be formed by depositing a layer of a reflective material, for example gold or silicon-aluminium (AlSi). Alternatively, the opaque surface can be formed by depositing a layer of an absorbent material, for example black resin or colloidal graphite. It can also be formed by gluing a (black or reflective) adhesive film cut to form the aperture.

The space of thickness Z comprised between the dark reticle and the detector is preferably transparent. This space is for example formed of vacuum or air. Alternatively, it may comprise or be made of a transparent material, for example glass or a transparent polymer.

A material "transparent at a given wavelength" or simply "transparent" is understood to mean a material that lets through at least 90% of the luminous intensity of the light having this wavelength.

The transparent optical aperture can be formed by a pinhole or a slot. A pinhole is a very small diameter and very small thickness hole. A very small diameter is for example comprised between 5 µm and 500 µm. A very small thickness is for example comprised between 100 nm and 100 µm. A slot is characterised by its width and its length, and optionally by its curvature. The width is for example comprised between 5 µm and 500 µm. The length is for example comprised between 500 µm and 2 mm.

In the present application, the diameter, the width and the length are taken according to directions transverse to the optical axis O, in the plane of the dark reticle. Thus, these transverse directions are taken in planes substantially parallel to the face of the retina facing the dark reticle. The diameter or width corresponds to the dimension a of the optical aperture. The thickness or the depth are taken along the optical axis O.

The retina is preferably typically in the form of an array of photodetectors constituting pixels of the detector.

The "useful volume", or "useful detection volume" is the intersection between the illumination beam(s) and the volume of probable presence of particles that can be detected with the detector. In other words, it is the volume defined by the intersection between the illumination beam, the particle beam, and the field of view of the detector. It is the volume that is used for detection.

In the present application, the beam is in particular configured to illuminate particles off the optical axis O. According to one example, the beam is configured to illuminate particles off the optical axis O, such that the useful detection volume has a lateral extension of at least about 50 µm, or even at least 100 µm relative to the optical axis of the detector. The beam can thus typically have a beam size of a few tens of µm to a few hundreds of µm.

The field of view is the solid angle for which the detector is sensitive to electromagnetic radiation.

In the context of the present invention, a light diagram expresses or illustrates the spatial distribution of a parameter which depends on the light intensity received by the photodetectors of the retina. Thus, a light diagram may be a representation of such a parameter depending on the position on an axis or on a plane or more generally on a flat or curved surface carrying the photodetectors. The parameter expressed can for example be the light intensity or be proportional to the light intensity.

For each scattering particle, the scattering diagram received by the photodetectors is typically derived from the convolution product of the scattering diagram of the particle by the figure (spot or shadow) projected onto the retina through the reticle.

The reticle is called dark reticle when the optical passage zone forms at least one aperture delimited by the optical blocking zone. In this case, the ratio of the opaque surfaces to the transparent surfaces is greater than 1, preferably much greater than 1. The opaque surface(s) of the reticle occupy a majority of the total surface of the reticle. The reticle is therefore "dark" and comprises one or more optical apertures.

The reticle is called clear reticle when the optical passage zone forms at least one aperture surrounding the optical blocking zone. In this case, the ratio of the transparent surfaces to the opaque surfaces is greater than 1, preferably much greater than 1. The transparent surface(s) of the reticle occupy a majority of the total surface of the reticle. The reticle is therefore "clear" and comprises one or more optical blocking zones.

In the case of a dark reticle, the periphery of the figure (spot) surrounds the first set of photodetectors. The first set of photodetectors is circumscribed inside the figure.

In the case of a clear reticle, the periphery of the figure (shadow) is surrounded by the first set of photodetectors. Thus, the arrangement of the first set of photodetectors is the negative of the figure (shadow).

The lighting beam(s) are emitted by one or more corresponding primary source(s). These primary sources can be polychromatic or monochromatic. The light emitted by these sources preferably belongs to the visible range extended to near ultraviolet and near infrared, that is to say for a wavelength range comprised between 300 and 1000 nm. The "wavelength" of the source or the "first wavelength" of the first source designate wavelengths of interest.

In the case of a polychromatic source, this wavelength of interest can be the most intense wavelength emitted by the source. It can also be understood as a range of wavelengths of a few tens of nanometres, for example of the order of 100 nm, preferably of the order of 50 nm.

In the case of a monochromatic or quasi-monochromatic source, the wavelength of interest is the only wavelength emitted by this source or the wavelength mainly emitted by this source.

In the following, this wavelength of interest is also referred to as "colour", to facilitate the reading of the description. This colour definition does not correspond directly to the colours of the rainbow (electromagnetic spectrum of the visible). It includes in particular "colours" from the near infrared and near UV domains, and/or excludes colours resulting from the mixture of disjoint colours of the electromagnetic spectrum such as purples for example.

A structural element is understood to mean a layer, "based" on a material A, a structural element, a layer comprising only this material A or this material A and possibly other materials, for example doping elements or alloy elements. Thus, if a transparent block is referred to as "polymer-based" transparent block, this means that it can be formed only from polymers or from polymers and possibly other materials, for example an inorganic oxide.

It is specified that in the context of the present invention, the term "on", "surmounts", "covers" or "underlying" or their equivalents do not mean "in contact with". Thus, for example, the deposition of a coating on a structural element does not necessarily mean that the latter are directly in contact with one another, but it does mean that the coating at least partially covers the structural element by being either directly in contact therewith, or by being separated therefrom by at least one other layer or at least one other element.

Unless specifically indicated otherwise, technical features described in detail for a given embodiment may be combined with technical features described in the context of other embodiments described by way of example and in a non-limiting manner. In particular, the number of apertures, the different aperture patterns and/or the different shapes of channels illustrated in the figures can be combined so as to form another embodiment which is not necessarily illustrated or described. Such an embodiment is obviously not excluded from the invention.

The terms "substantially", "about", "of the order of" mean "to within 10%" or, in the case of an angular orientation, "to within 10°" and preferably "to within 5°". Thus, a direction substantially normal to a plane means a direction having an angle of 90±10° relative to the plane.

To determine the optical properties of the detector, measurements of opacity (absorption and/or reflection spectra), transparency (transmission spectrum), field of view (solid angle of detection) can be performed. For example, spectrometric techniques and integrating sphere techniques will be used to carry out these measurements.

Simulation methods, for example by calculation of ray tracing by Monte Carlo method, can also allow to determine the scattering diagram(s) obtained through a detector. The effective separation of the scattering diagrams from several particles detected simultaneously can be an indication of the implementation of a detector as described in the present invention.

A first simplified example of a detector according to the invention will now be described with reference to FIG. 3, to understand its operating principle.

For the sake of clarity, the case of an aperture in the reticle giving rise to spots T1, T2 (dark reticle) will be more particularly described. The case of a dark surface in the reticle (clear reticle) giving rise to shadows B1, B2, which can be considered as a negative of the first case, can be easily deduced from this first case described below. This case with clear reticle will be described in detail, for example with reference to FIGS. 12 to 13C.

Figure 3:
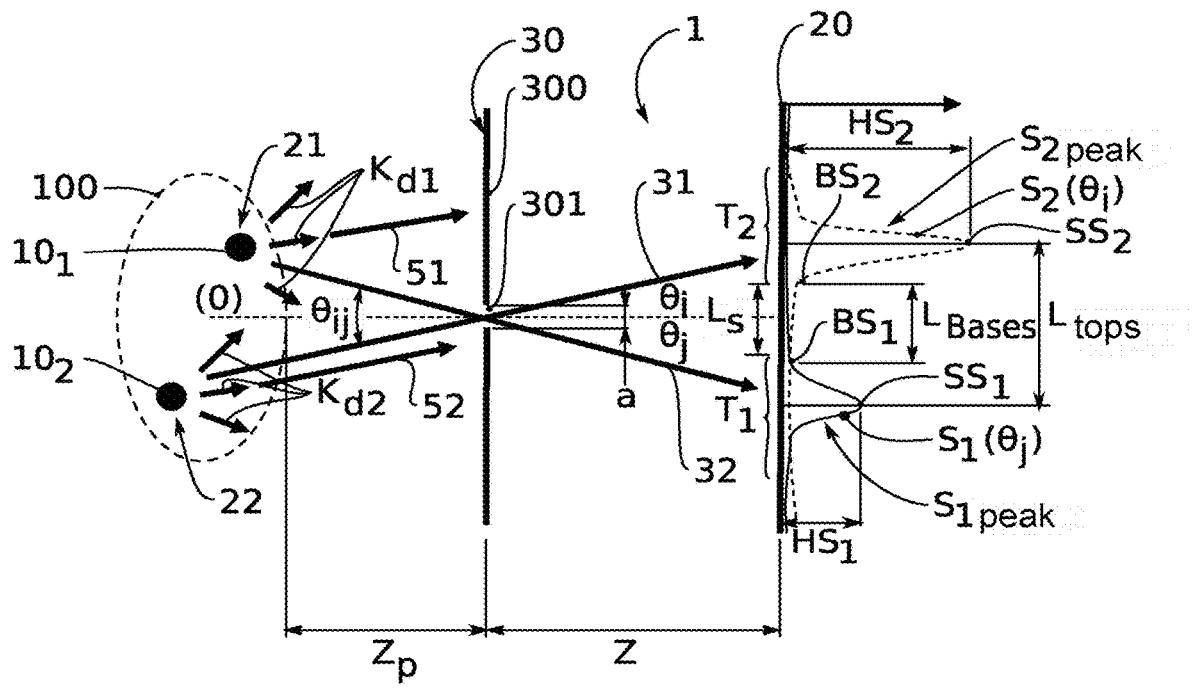
FIG. 3 schematically illustrates in section a detector according to an exemplary embodiment of the invention and the scattering diagrams of two particles formed on the retina of this detector.

As illustrated in the diagram of FIG. 3, the detector 1 is intended to detect at least two particles $10_1$, $10_2$ within a useful volume 100. This useful volume 100 is a zone of space which receives lighting and where the particles $10_1$, $10_2$ circulate. The possibilities and lighting conditions of this useful volume 100 are described in the section "lighting beam" later in the description. The zone of the space can be free or delimited by material elements. It may in particular extend within a particle transport channel or towards a mouth of such a channel, for example at an outlet orifice of this channel. Some embodiments of the detector comprising such a channel are described in the section "through channel" later in the description.

When the particles $10_1$, $10_2$ are in the useful volume 100, they receive incident light rays emitted by a primary source (not illustrated), then in turn emit scattered light rays $k_{d1}$, $k_{d2}$. These two particles $10_1$, $10_2$ therefore form secondary sources 21, 22 which illuminate the detector 1.

The term primary source is not limiting to a certain type of source. This primary source may be a light source itself generating light in the useful volume 100. It may also be a device comprising a source generating light and associated with an optical device for guiding the light to the useful volume 100 and/or a device for forming a beam comprising light rays passing through the useful volume 100.

The detector 1 is configured to filter and receive part of the scattered light rays $k_{d1}$, $k_{d2}$. It advantageously comprises a reticle 30 to filter the scattered light rays $k_{d1}$, $k_{d2}$, and a retina 20 to receive only the rays $k_{d1}$, $k_{d2}$ filtered by the reticle 30.

The reticle 30 comprises an opaque surface 300 and at least one optical aperture 301. In the example illustrated the optical aperture 301 has a surface much smaller than the optical blocking zone. The reticle is a dark reticle type. It is preferably flat and parallel to the retina 20. The exemplary embodiments of the detector described and illustrated below are based on such a dark reticle which is flat and parallel to the retina, so as to facilitate understanding of the invention. The reticle and/or the retina may alternatively have a curvature. In this case, a direction perpendicular to the retina means a direction perpendicular to the tangent to the retina at the point considered, for example at the intersection between the retina and the optical axis. The reticle and the retina may not be parallel to each other. For example, a curved retina and a curved reticle forming portions of concentric spheres whose centre is positioned at the useful volume can be implemented within a detector according to the invention. In this case, the examples of construction and dimensioning of the detector can be adapted mutatis mutandis.

The aperture 301 is configured to let through part 31 of the scattered rays $k_{d1}$ and part 32 of the scattered rays $k_{d2}$. The features of this aperture 301, in particular its shape and its dimensioning, are described in the corresponding sections "shape of the aperture" and "dimensioning of the aperture".

The scattered parts 31, 32 respectively form with the optical axis O of the detector the angles $\theta_j$, $\theta_i$. The angular distance between the particles $10_1$, $10_2$, that is to say the angle formed by the scattered parts 31, 32 penetrating into the aperture 301 is denoted $\theta_{ij}=\theta_j+\theta_i$. $\theta_i$, $\theta_j$ and $\theta_i$ are referenced in FIG. 3.

The parts 31, 32 are projected onto the retina 20, and respectively form the scattering diagrams $S_1(\theta_j)$, $S_2(\theta_i)$, also denoted S1 and S2 for the sake of brevity. Their respective positions on the retina 20 depend on the angles $\theta_j$, $\theta_i$. Preferably, these scattering diagrams $S_1(\theta_j)$, $S_2(\theta_i)$ each have a light peak, referenced respectively $S_{1peak}$ and $S_{2peak}$ in this example, $L_{Bases}$ being the distance between the bases $BS_1$, $BS_2$ of these peaks $S_{1peak}$ and $S_{2peak}$, $L_{Tops}$ being the distance between the tops $PS_{1peak}$, $PS_{2peak}$ of these peaks $S_{1peak}$ $S_{1peak}$. The distance between the spots T1, T2 formed by the projection onto the retina 20 of the first and second scattered parts is denoted Ls.

The detector, in particular the minimum dimension of the aperture 301 as well as the minimum distance Z taken along the optical axis O between the reticle 30 and the retina 20 is configured so as to be able to distinguish the spots T1, T2 and the scattering diagrams $S_1(\theta_j)$, $S_2(\theta_i)$.

Thus, when the particles are sufficiently far apart (typically when they together define an angle $\theta_{ij}$ whose value is at least equal to the angular resolution $\delta\theta$ of the detector) the distances Ls, $L_{Bases}$ and $L_{Tops}$ are non-zero. Moreover, the pitch Lpix of the photodetectors of the retina 20 is sufficiently small for these distances Ls, $L_{Bases}$ and $L_{Tops}$ to allow the photodetectors to separately identify the spots T1, T2 and the scattering diagrams $S_1(\theta_j)$, $S_2(\theta_i)$ when $\theta_{ij} \geq \delta\theta$.

This angular resolution $\delta\theta$ corresponds to the smallest angular difference $\theta_{ij}=\theta_j+\theta_i$ between the two scattering particles $10_1$, $10_2$ that the detector is capable of detecting. If $\theta_{ij} \geq \delta\theta$, then the distances Ls, $L_{Bases}$ and $L_{Tops}$ are non-zero and the detector 1 is able to discriminate the two spots T1, T2 or the two peaks $S_{1peak}$ and $S_{2peak}$. The detector 1 will identify the presence of each of the two particles $10_1$, $10_2$.

For example, for an aperture 301 separated from the retina 20 by a distance Z, the minimum separation distance $L_{Tops}$ is equal to: $L_{Tops}=Z(\tan\theta_i+\tan\delta_j)$. The minimum separation distance $L_{Tops}$ allowing to distinguish on the retina 20 the scattering diagrams $S_1(\theta)$, $S_2(\theta)$ corresponds to the linear resolution of the detector 1.

The dimensioning of the detector 1 according to the desired resolution is described in more detail in the section "dimensioning of the detector". A method for manufacturing such a detector 1 is also described in the corresponding section "manufacturing method".

Figure 4:
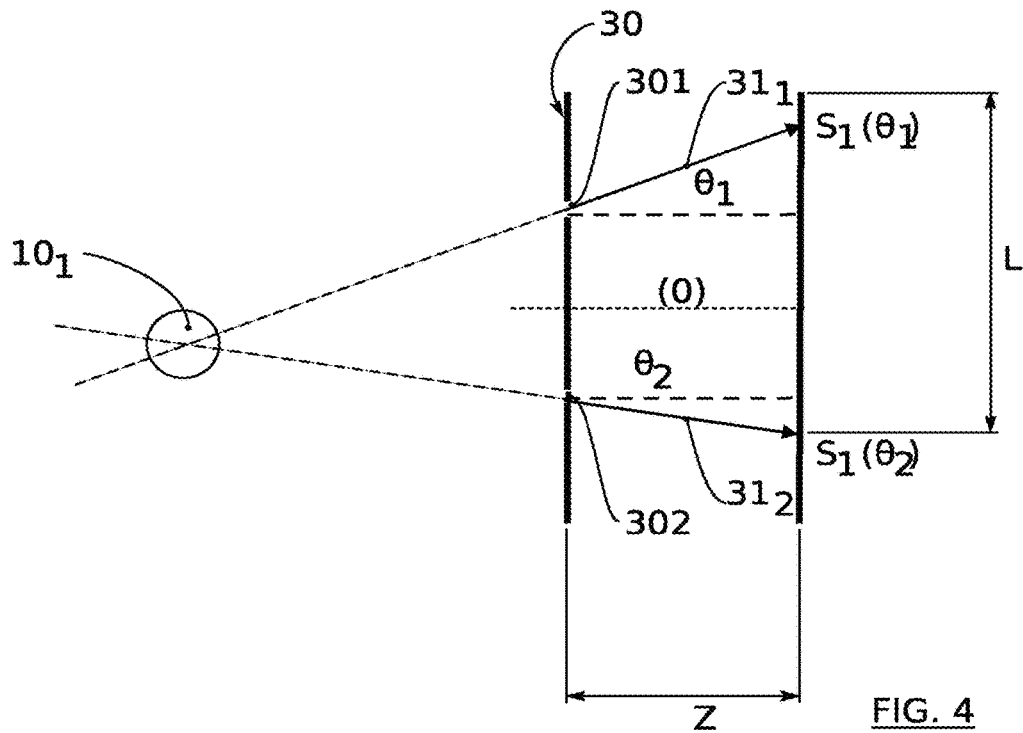
FIG. 4 schematically illustrates in section a detector according to another embodiment of the present invention.

According to one possibility illustrated in FIG. 4, the reticle 30 of the detector 1 comprises several apertures 301, 302. This allows to obtain an enriched scattering diagram for each of the scattering particles. For the sake of clarity, a single particle 101 is shown in FIG. 4. This particle 101 scatters a first part $31_1$ of light rays through the first aperture 301, and a second part $31_2$ of light rays through the second aperture 302. These first and second parts $31_1$, $31_2$ form a scattering diagram $S_1(\theta_1, \theta_2)$. The scattering diagram $S_1(\theta_1, \theta_2)$ may comprise several discrete portions, for example the spots $S_1(\theta_1)$ and $S_1(\theta_2)$ seen through the apertures 301, 302 respectively under the angles $\theta_1$, $\theta_2$.

This enriched scattering diagram $S_1(\theta_1, \theta_2)$ allows in particular to determine the position of the particle $10_1$ within the useful detection volume. This position corresponds, according to the principle of the reversibility of light, to the crossing of the light rays forming the parts $31_1$, $31_2$.

In this case with several apertures 301, 302, the distances Ls, $L_{Bases}$ and $L_{Tops}$ correspond to the distances between the spots, the bases and the tops of the scattering diagrams formed by the rays scattered by two particles through only one of the apertures 301, 302.

Shape of the Aperture and/or the Dark Surface

For the sake of clarity, different shapes of a single aperture are described in this section. It is understood that these shapes can be applied to several apertures and/or dark surfaces. Several apertures and/or dark surfaces can further combine different shapes depending on the different advantages associated with each shape.

A shape can be transparent (case of the apertures) or opaque (case of the dark surfaces). Thus, a pinhole can be a transparent disk or a hole (case of the apertures) or an opaque disk (case of the dark surfaces). Each shape or pattern can thus be adapted mutatis mutandis to the case in question.

The simplified diagrams illustrated by FIGS. 3 and 4 are based on simple apertures 301, 302 in the shape of holes, or pinholes. The pinhole pattern allows to project onto the retina a point spot T1, T2 for each scattering particle. The corresponding scattering diagram thus comprises a portion in the shape of a peak $S_{1peak}$, $S_{2peak}$ for each of the particles, allowing for example to facilitate the interpretation of the scattering diagram.

Figure 5:
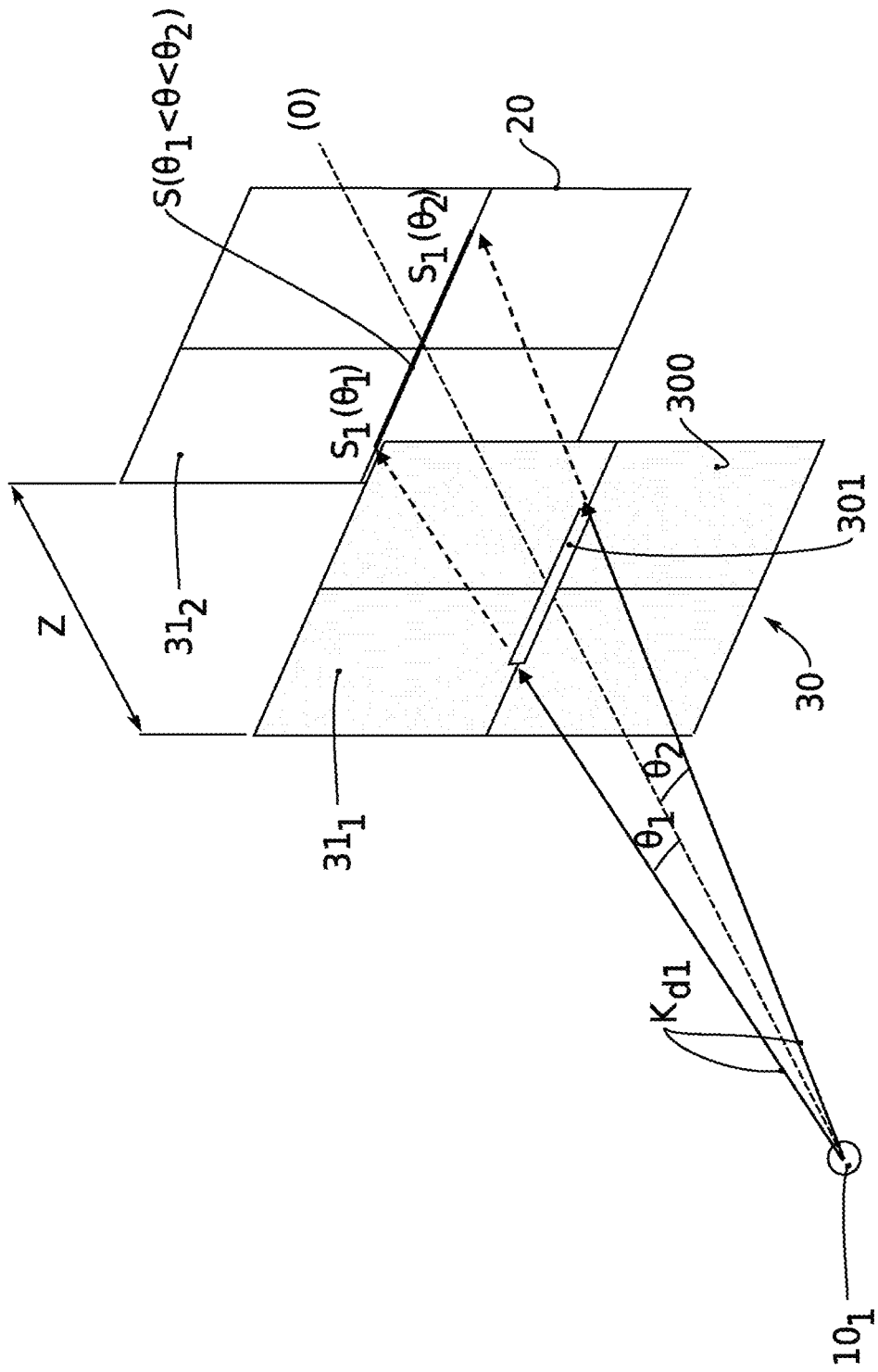
FIG. 5 schematically illustrates in perspective view a detector according to another embodiment of the present invention.

FIG. 5 illustrates an aperture 301 in the shape of a slot. This slot pattern allows to obtain an enriched scattering diagram for each scattering particle. For the sake of clarity, a single particle $10_1$ is represented in FIG. 5. This particle $10_1$ scatters a plurality of light rays through the first aperture 301. The light rays received by the retina 20 are comprised between the parts $31_1$ and $31_2$ passing through each end of the slot. These light rays comprised between the parts $31_1$, $31_2$ form a scattering diagram $S_1(\theta_1<\theta<\theta_2)$. This scattering diagram $S_1(\theta_1<\theta<\theta_2)$ preferably comprises a continuous portion, formed by a continuum of spots $S_1(\theta)$ seen through the aperture 301 under a continuum of scattering angles $\theta$ comprised between $\theta_1$ and $\theta_2$.

The slot is not necessarily straight, it can be curvilinear.

FIGS. 6A to 6J illustrate different possible shapes for a reticle aperture. These shapes are typically combinations of slots and pinholes, enriching and facilitating the reading of the corresponding scattering diagrams. All the shapes below can be combined and/or reproduced several times to form one or more apertures and/or dark surfaces of the same detector. The detector according to the invention is not limited to the only examples of shapes mentioned below by way of example. Other shapes of apertures and/or dark surfaces are possible.

Figure 6A:
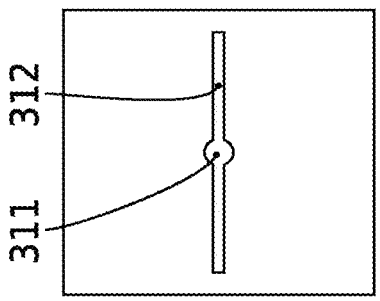
FIGS. 6A to 6J schematically illustrate patterns of passage zones of a reticle of a detector according to different embodiments of the present invention.
Figure 6B:
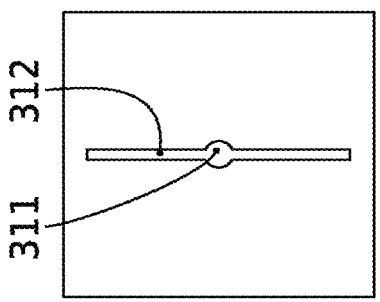

FIGS. 6A and 6B illustrate a shape resulting from the combination of a rectilinear slot pattern 312 and a pinhole pattern 311, located for example at the centre of the slot pattern 312. The slot can be oriented along the direction of the continuum scattering angles that is to be detected and analysed, for example a horizontal direction (FIG. 6A) or a vertical direction (FIG. 6B).

Figure 6C:
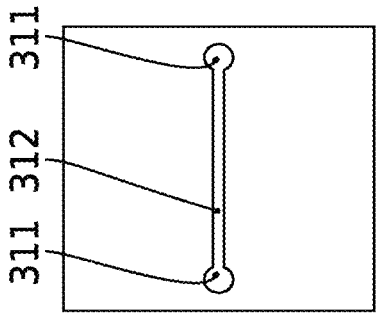

FIG. 6C illustrates a shape resulting from the combination of a rectilinear slot pattern 312 and several pinhole patterns 311, for example two pinholes located at the ends of the slot pattern 312.

Figure 6D:
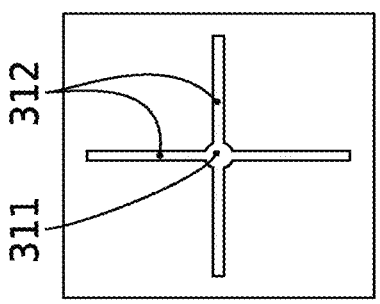

FIG. 6D illustrates a shape resulting from the combination of the patterns of FIGS. 6A and 6B. This shape allows to detect and analyse continuums of scattering angles in orthogonal directions, for example the horizontal and vertical directions. The shape of FIG. 6D comprises two rectilinear slots 312 which intersect, preferably in their middle, and preferably forming a right angle. A pinhole 311 is formed at the intersection of the two slots 312.

Figure 6E:
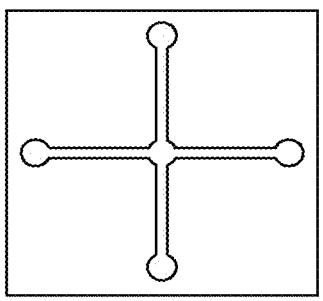
Figure 6F:
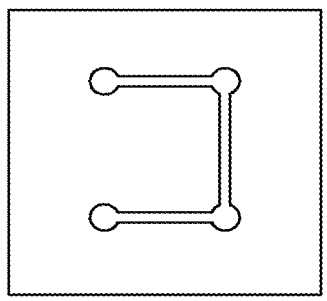

FIGS. 6E and 6F illustrate shapes resulting from the combination of several rectilinear slot patterns 312 and several pinhole patterns 311. The shape of FIG. 6E adds to that of FIG. 6D a pinhole at each of the ends of the slots 311. The shape of FIG. 6F comprises several rectilinear slots juxtaposed to each other at their ends and with a pinhole at each of their ends. The contour formed by this succession of slots and pinholes can be open and form, for example, three segments orthogonal in pairs. Alternatively, this contour can be closed.

Figure 6G:
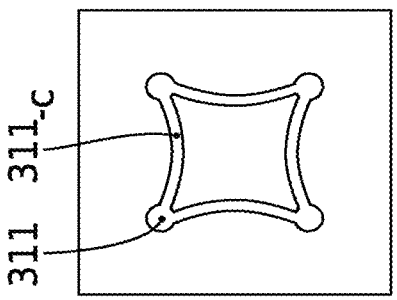

FIG. 6G illustrates a shape resulting from the combination of several curvilinear slot patterns $313_{-c}$ and several pinhole patterns 311. The curvilinear slot patterns $313_{-c}$ here have a curvature called negative curvature, that is to say extending towards the centre of the reticle or aperture. Such a negative curvature allows to compensate for a deformation induced by the medium comprised between the reticle 30 and the retina 20, in the case where this medium has a refractive index $n_+$ greater than that wherein the scattering particle is located. This shape allows, for example, to project onto the retina 20, in the presence of this medium of refractive index $n_+$, a diagram similar to that projected by the shape illustrated in FIG. 6F, in the absence of this medium of refractive index $n_+$. The geometry of this shape therefore has a "straightening" effect on the projection of the scattering diagram onto the retina.

Figure 6H:
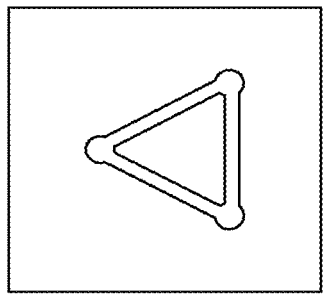

FIG. 6H illustrates a shape resulting from the combination of several rectilinear slot patterns 312 and several pinhole patterns 311. In this example, the directions of the scattering angle continuums to be detected are not orthogonal. The slots are straight and are juxtaposed so as to form a closed contour. A pinhole is formed at each juxtaposition of two adjacent slots. In this example, the closed contour is a triangle, which is equilateral in this non-limiting example.

In general, the shapes illustrated by FIGS. 6C, 6E, 6F, 6G, 6H make it easier to read the scattering diagram projected onto the retina. In particular, scattering diagrams comprising a plurality of circular spots as obtained through a plurality of pinholes are easily identifiable using shape recognition algorithms.

Figure 6I:
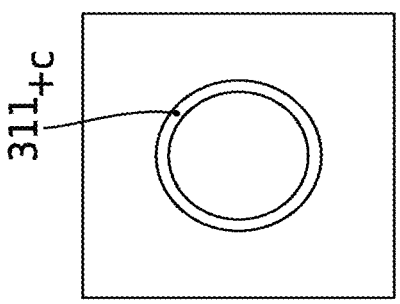
Figure 6J:
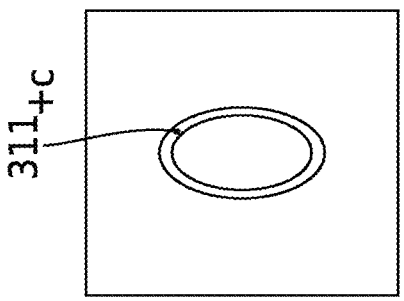
Figure 7A:
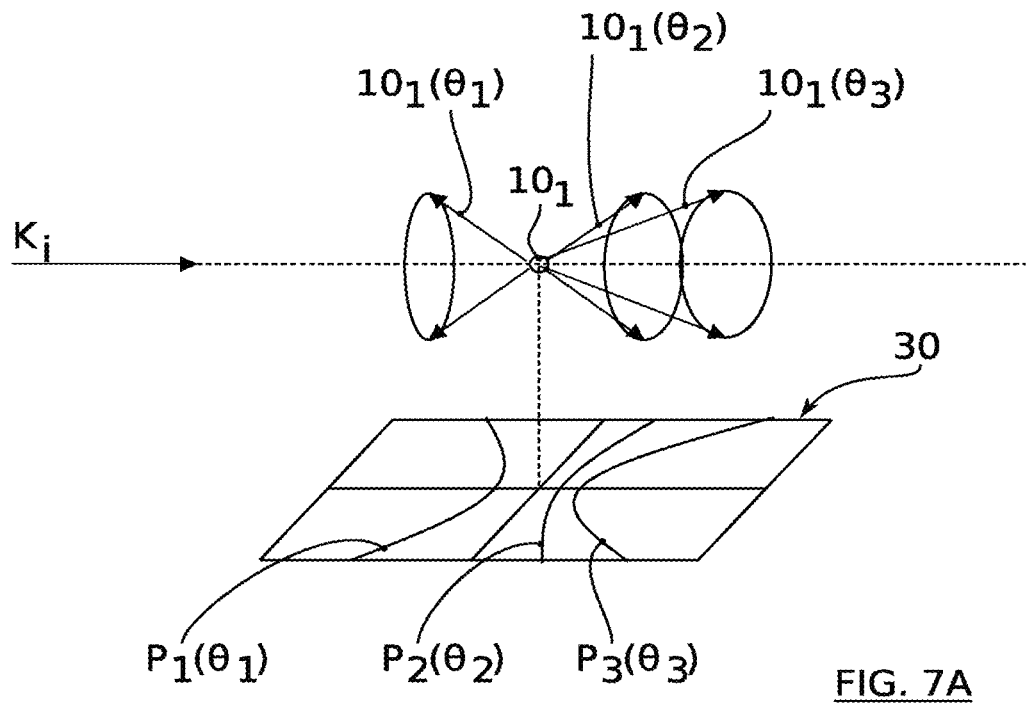
FIGS. 7A and 7B schematically illustrate a projection of scattered rays onto a reticle of a detector according to one embodiment of the present invention.

FIGS. 6I and 6J illustrate shapes comprising curvilinear slot patterns $313_{+c}$ having a curvature called positive curvature, that is to say extending towards the periphery of the reticle or of the aperture. Such a shape can have a closed contour, such as a ring (FIG. 6I) or an ellipse (FIG. 6J) for example. A ring aperture shape allows in particular to observe Mie alternations, which appear as lobes in the angular scattering diagram, according to the Mie theory. An elliptical aperture shape allows to optimise the observation of Mie alternations, in particular when the incident rays illuminating the scattering particle are substantially parallel to the plane wherein the reticle extends, as illustrated in FIG. 7A.

Figure 7B:
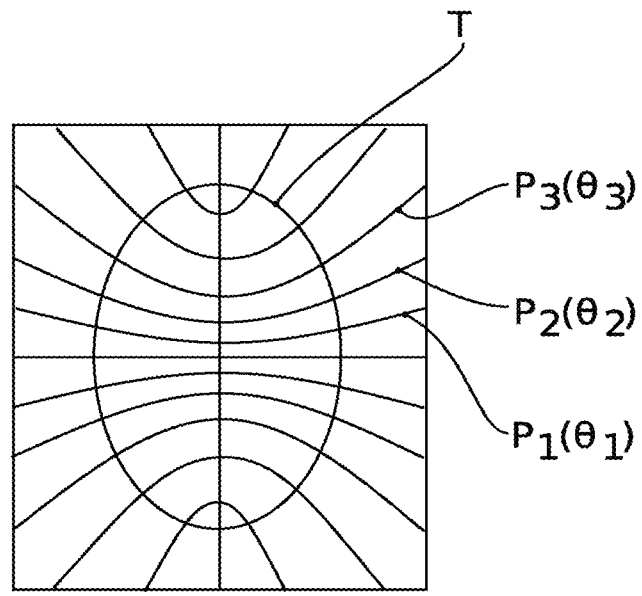

In this case, the rays $10_1(\theta_1)$, $10_1(\theta_2)$, $10_1(\theta_3)$ scattered respectively at an angle $\theta_1$, $\theta_2$, $\theta_3$ form coaxial cones around the direction of the incident rays K. These cones called "iso-$\theta$" cones are projected onto the reticle 30 respectively according to hyperbolas $P_1(\theta_1)$, $P_2(\theta_2)$, $P_3(\theta_3)$ (in FIG. 7A, the hyperbolas illustrated do not correspond exactly to the rays projected, for clarity). These "iso-$\theta$" hyperbolas $P_1(\theta_1)$, $P_2(\theta_2)$, $P_3(\theta_3)$ are the location of the Mie lobes. A slot following a trajectory T orthogonal to the "iso-$\theta$" hyperbolas is therefore optimised for the observation of the alternations of these Mie lobes. In the case of hyperbolas $P_1(\theta_1)$, $P_2(\theta_2)$, $P_3(\theta_3)$, this trajectory T is an ellipse (FIG. 7B).

Generally, the aperture and/or dark surface may have any combination of pinhole, straight slot, negative curvilinear slot, and positive curvilinear slot patterns.

Dimensioning of the Aperture and/or the Dark Surface

The characteristic size or dimension a of the aperture and/or of the dark surface is a linear dimension: it is for example the diameter of a circular hole or the width of a slot.

Figure 8A:
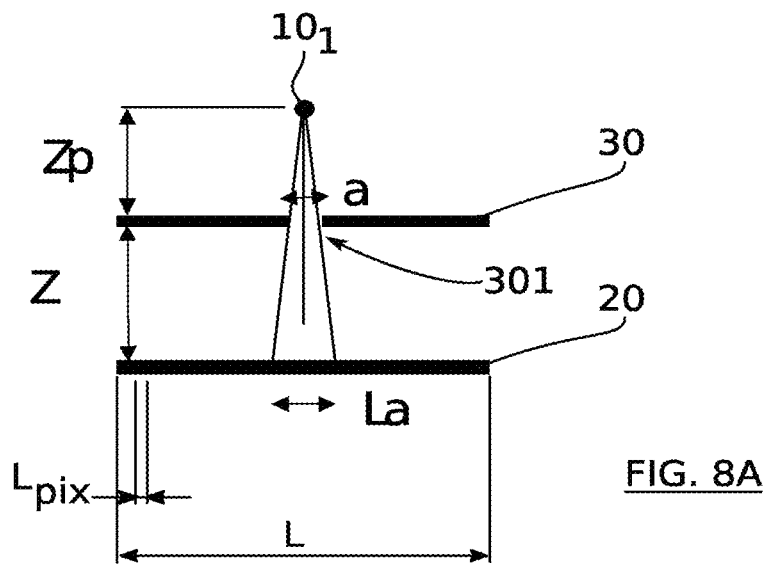
FIGS. 8A and 8B schematically illustrate a projection onto a retina of rays scattered through a passage zone of a detector according to an embodiment of the present invention.

The aperture is preferably large enough to obtain good resolution of the projected scattering diagrams. As illustrated in FIG. 8A, for a particle $10_1$ located at a distance Zp from the reticle 30 of the detector, the scattering diagram of this particle or the spot projected onto the retina 20 through an aperture 301 of dimension a has a dimension La. This dimension La depends on the dimension a, the distance Z separating the reticle 30 from the retina 20, and the distance Zp separating the particle $10_1$ from the reticle 30. In particular, $La=a*(Z+Zp)/Zp$.

Z and Zp are measured along directions parallel to the optical axis (O). Z and Zp are measured in directions perpendicular to a plane wherein the retina 20 mainly extends, or more exactly a face of the retina 20 facing the reticle 30.

For given Z and Zp, the dimension a is selected such that La>Lpix, Lpix being the pitch between two adjacent photodetectors, that is to say a pixel pitch of the retina. Preferably, the dimension a is selected such that La is comprised between 1 and 20 pixel pitches (1·Lpix<La<20·Lpix), and preferably such that La is approximately equal to 10 pixel pitches (La=10·Lpix). The detector thus has good linear resolution.

Figure 8B:
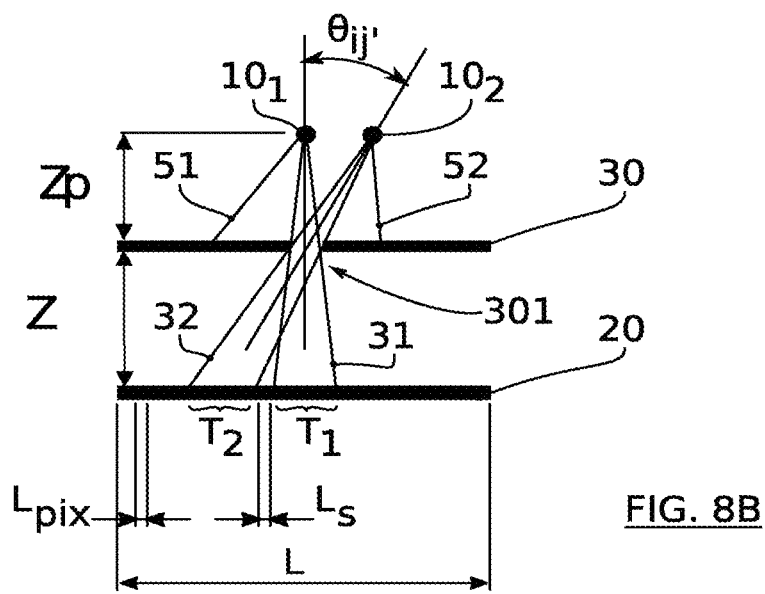

The aperture is preferably also small enough to avoid a superposition of the projected scattering diagrams. As illustrated in FIG. 8B, for two particles $10_1$, $10_2$ having an angular difference $\theta_{ij}$ (with $\theta_{ij} \geq \delta\theta$, $\delta\theta$ being the resolution of the detector) and located at a distance Zp from the reticle 30, the spots T1, T2 projected onto the retina 20 through the aperture 301 of dimension a are separated by a distance Ls. The dimension a is selected such that Ls is preferably greater than or equal to 2*Lpix and preferably Ls≥5*Lpix and preferably Ls≥10·Lpix. The spots T1 and T2 are thus clearly distinct on the retina 20. It is then possible to separately identify these spots and the corresponding scattering diagrams. The counting of the particles $10_1$, $10_2$ as well as their analysis is thus easy.

The dimensioning of the aperture therefore depends on the distances Z and Zp, the angular resolution $\delta\theta$ of the detector 1 and the separation distance Ls:

$$a = (Z.\tan(\delta\theta) - L_s)\frac{Z_p}{Z + Z_p}$$

In the case of an aperture having a combination of slot and pinhole patterns, the width of the slot is preferably half the diameter of the pinhole. In this case, the dimension a corresponds to the width of the slot. Generally, the dimension a is the smaller among the pinhole diameter and the slot width.

In the case of a plurality of apertures, the total surface of these apertures, taken in the plane of the dark reticle, is preferably less than 50% of the surface of the dark reticle, and preferably less than 10% of the surface of the dark reticle. This allows to limit on the retina the superposition zones of the scattering diagrams projected through these apertures. The readability of the scattering diagrams is improved.

This ability of the detector 1 to distinctly identify the scattering diagram S1, S2 of each particle $10_1$, $10_2$ can also be characterised with respect to the distance $L_{Bases}$ expressing the offset between the bases $BS_1$, $BS_2$ of each scattering diagram S1, S2 formed by the same pattern of the aperture 301.

Thus, provision can be made for the minimum distance Z and for the aperture 301, in particular the dimension a, to be configured so that $L_{Bases} \geq 2*Lpix$ when the first 31 and second 32 scattered parts passing through the aperture 301 together define an angle $\theta_{ij} \geq \delta\theta$. Preferably, $L_{Bases} \geq 5*Lpix$. Preferably, $L_{Bases} \geq 10*Lpix$.

Preferably, the base $BS_1$, $BS_2$ is measured at a height of the peak $S_{1peak}$, $S_{2peak}$ equal to 10% of the height $HS_1$, $HS_2$ of the top $SS_1$, $SS_2$, and preferably located at a height of the peak $S_{1peak}$, $S_{2peak}$ equal to 5% of the height of the top $SS_1$, $SS_2$. The heights $HS_1$, $HS_2$ of the tops $SS_1$, $SS_2$ are illustrated in FIG. 3.

This ability of the detector 1 to distinctly identify the scattering diagram S1, S2 of each particle $10_1$, $10_2$ can also be characterised with respect to the distance $L_{Tops}$ expressing the offset between the tops $SS_1$, $SS_2$ of the scattering diagrams S1, S2.

Thus, provision can be made for the minimum distance Z and for the aperture 301 to be configured so that $L_{Tops} \geq 10*Lpix$ when the first 31 and second 32 parts passing through the aperture 301 together define an angle $\theta_{ij} \geq \delta\theta$. Preferably, $L_{Tops} \geq 20*Lpix$.

Dimensioning of the Detector

The detector is in particular characterised by its angular resolution $\delta\theta$, by the distance Z separating the dark reticle 30 from the retina 20, by its field of view FOV and the dimension L of the retina, and by the distance Zp separating the useful detection volume 100 from the dark reticle 30.

The angular resolution of the detector is preferably of the order of 2°.

The retina comprises a plurality of photodetectors forming pixels. A pixel pitch Lpix is typically of the order of a few microns, for example 0.5 µm<Lpix<20 µm. The retina is preferably a CMOS type imager. The width L of the retina is typically of the order of a few millimetres, for example 1 mm<L<5 mm.

The field of view FOV depends on the distance Z and the width L of the retina, such that FOV=a tan(L/2Z).

The field of view FOV is typically of the order of a few tens of degrees, for example 30°<FOV<90°, preferably FOV is of the order of 60°. This field of view can be selected according to the desired useful detection volume. In particular, the entire useful detection volume is preferably comprised in this field of view FOV. The distance Z can therefore be adapted according to the distance Zp separating the useful detection volume from the dark reticle. In particular, the distance Z is selected such that $0.5 \cdot Zp \leq Z \leq 20 \cdot Zp$, for example 100 µm≤Z≤2 mm.

The dark reticle 30 is maintained at the distance Z from the retina 20 by a structural element. This structural element can be in the form of spacers, side walls, or a transparent block, for example.

Figure 9:
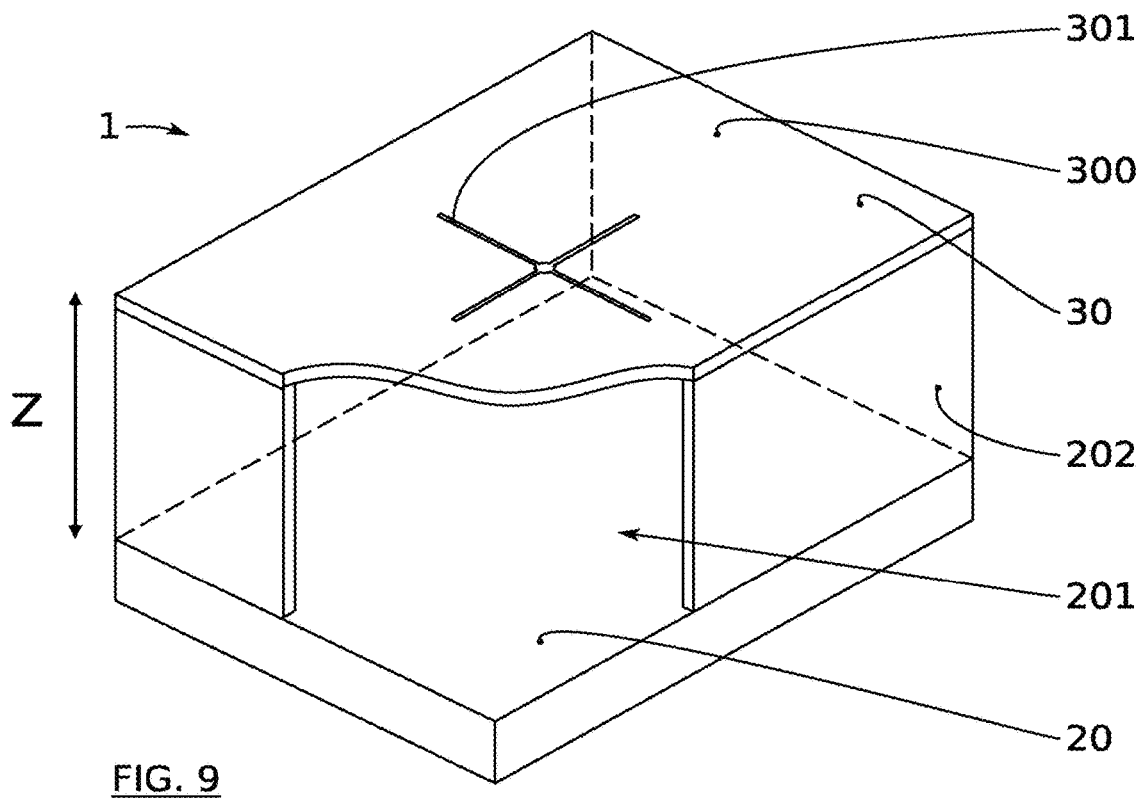
FIG. 9 schematically illustrates in perspective view a detector according to another embodiment of the present invention.

According to an embodiment illustrated in FIG. 9, the detector 1 is similar to a casing comprising the retina 20 as a "pedestal" and the dark reticle 30 as a "cover". This casing has side walls 202 extending between the retina 20 and the dark reticle 30 and forming a closed contour around the internal space 201 located between the retina 20 and the dark reticle 30. The side walls have a height Z and are preferably opaque. They can be assembled on the sensitive face of the retina, on the margin of the active zone of the retina comprising the photodetectors, or on the flanks of the retina, around the sensitive face of the retina. The internal surfaces of these walls 202, facing the internal space 201, are preferably absorbent. This limits parasitic reflections in the housing, according to the known principle of the dark room. This improves the accuracy of the detector 1.

In this example, the detector 1 comprises an aperture 301 having the pattern illustrated in FIG. 6D. A detector 1 comprising sidewalls as shown here may also comprise other apertures and/or other aperture patterns.

Figure 10:
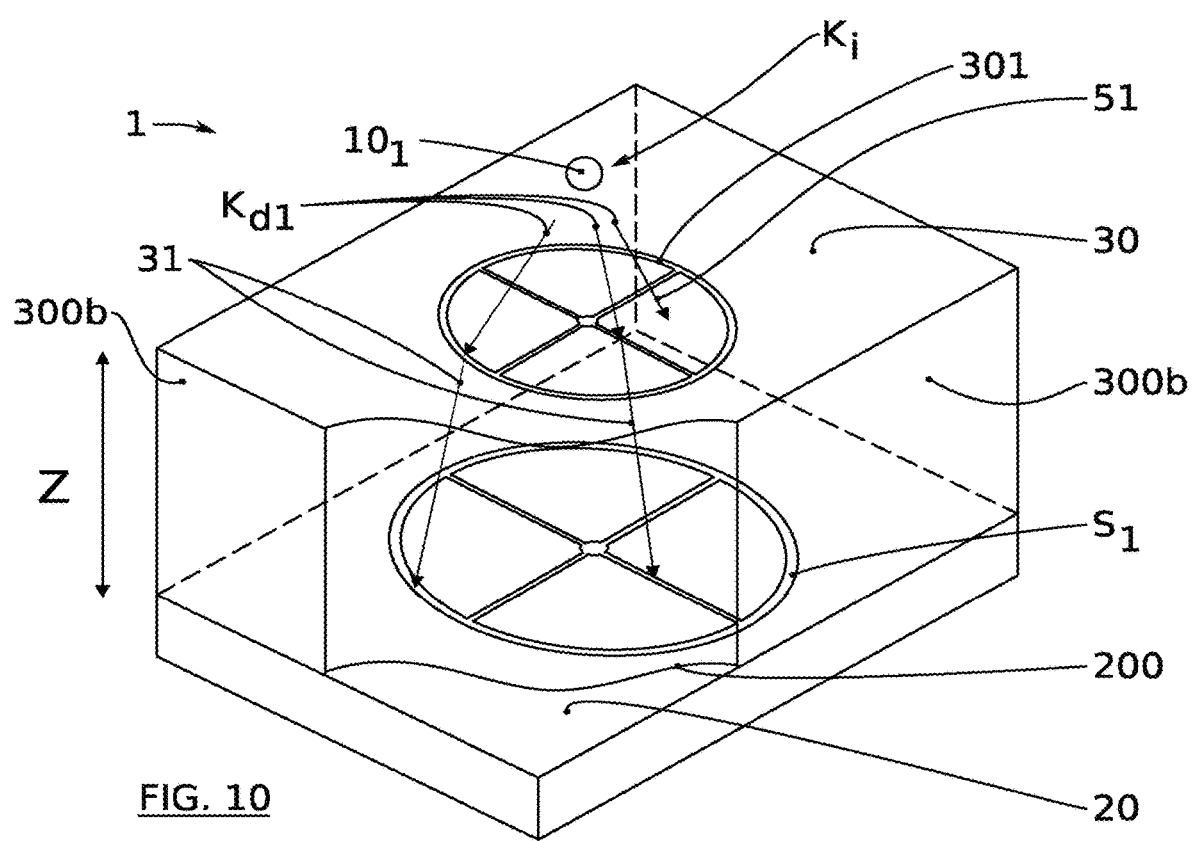
FIG. 10 schematically illustrates in perspective view a detector according to another embodiment of the present invention.

According to an embodiment of the detector 1 illustrated in FIG. 10, the structural element allowing to support the dark reticle 30 at the distance Z from the retina 20 is a transparent block 200. Thus, in this example, the light rays propagate within the material of this block. The block 200 is preferably monolithic. It includes no vacuum or air therein.

The dark reticle 30 is formed on the upper face of the transparent block. According to one possibility, an antireflection layer is deposited between the dark reticle 30 and the upper face of the transparent block 200. This allows to limit or even eliminate the reflections of the scattered light rays $k_{d1}$ at the aperture 301, in particular at the upper face of the transparent block 200 exposed through the aperture 301. This antireflection layer allows in particular to improve the sensitivity of the detector.

Alternatively, if the transparent block 200 extends into the aperture 301, or if the aperture 301 is filled with another transparent material, so as to form a transparent surface flush with the opaque surface 300 of the dark reticle 30, the antireflection layer can be deposited above the dark reticle, on transparent and opaque surfaces.

The lateral surfaces 300*b* of the transparent block 200 are preferably opaque. They are for example covered by an opaque coating, and preferably by an opaque and absorbent coating. The retina 20 is thus attached to a block forming a dark room open only at the optical aperture 301. In FIG. 10, a particle $10_1$ receiving incident rays $k_i$ and scattering scattered rays $k_{d1}$ is illustrated. A part 51 of the scattered light rays $k_{d1}$ is stopped by the dark reticle, and a part 31 of the scattered light rays $k_{d1}$ is transmitted by the dark reticle, through the aperture 301. This part 31 propagates in the transparent block 200 to the retina 20, to form the scattering diagram $S_1$.

The transparent block 200 can be made of a transparent material such as a glass, an optical polymer, a silicone, a plastic, a sol-gel compound. In this case, the transparent block has a refractive index greater than that of the useful detection volume (typically air). The scattering diagram $S_1$ projected through such a transparent block is slightly deformed by refraction effect. This deformation is in practice not a problem. It may be characteristic of the use of such a detector. It can further be corrected by adapting the shape of the aperture (example of the pattern with negative curvature shown in FIG. 6G).

The aperture pattern 301 shown here is an example of the combination of the cross (FIG. 6D) and ring (FIG. 6I) patterns.

When several particles are illuminated simultaneously in the useful detection volume, the retina receives several scattering diagrams projected through the dark reticle.

Figure 11:
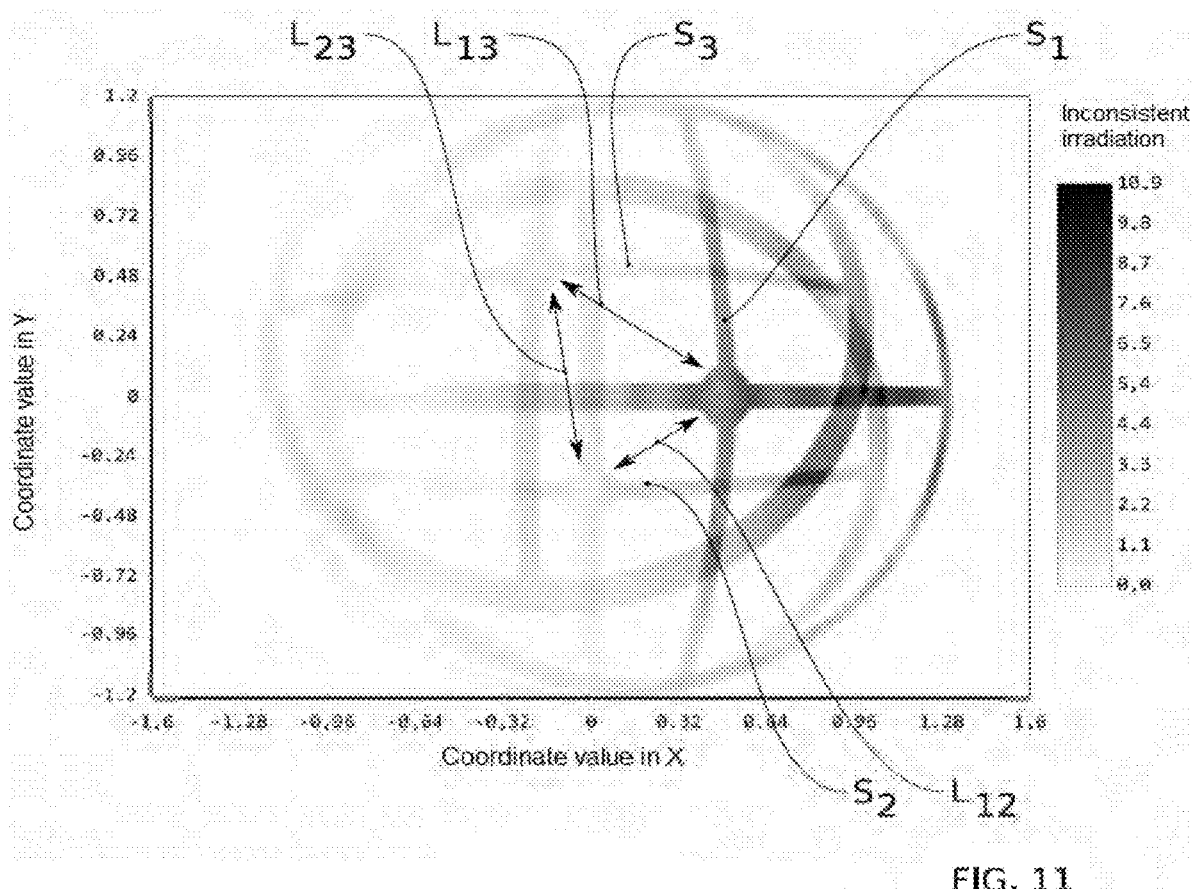
FIG. 11 shows a simulation of an image formed on the retina of the detector illustrated in FIG. 9, from the simultaneous scattering of three spherical particles 1 µm, 2 µm and 5 µm in diameter respectively.

FIG. 11 shows a calculation result according to the Mie theory which was projected by a ray tracing according to a Monte Carlo method. This result shows three scattering diagrams $S_1$, $S_2$, $S_3$ obtained for three particles of different size (polystyrene spheres of 1, 2 and 4 µm) detected by the detector 1 illustrated in FIG. 10. In this example if the pattern 301 is an aperture delimited by an optical blocking zone, the reticle is then a dark reticle. In this case, each scattering diagram $S_1$, $S_2$, $S_3$ forms a spot of light on the retina 20.

As mentioned previously, these scattering diagrams $S_1$, $S_2$, $S_3$ are slightly deformed by refraction effect. These scattering diagrams $S_1$, $S_2$, $S_3$ are nevertheless quite distinct on the retina. It is therefore perfectly possible to count the particles. It is for example possible to distinguish on each diagram $S_1$, $S_2$, $S_3$ the pattern formed by a pinhole located at the intersection of two slots. L12 corresponds to the distance between this pattern formed by the diagram $S_1$ and this pattern formed by the diagram $S_2$. L13 corresponds to the distance between this pattern formed by the diagram $S_1$ and this pattern formed by the diagram $S_3$. L23 corresponds to the distance between this pattern formed by the diagram $S_2$ and this pattern formed by the diagram $S_3$. It is also possible to determine the geometric (diameter) and optical (refractive index) parameters of each of the particles, after analysing the scattering diagrams $S_1$, $S_2$, $S_3$. The detector can in particular be coupled to a system provided with such analysis capacities, for example a microprocessor and an ad hoc calculation routine.

According to an embodiment illustrated in FIGS. 12, 13A, 13B and 13C, the at least one optical blocking zone has a surface smaller than that of the at least one optical passage zone.

Thus, a clear reticle 30 comprising an opaque surface 300 in the shape of a cross, for example, and a transparent surface 301 around the opaque surface 300 may be preferred to the examples described above. Other opaque surface 300 patterns can of course be used. For example and without limitation, the aperture patterns illustrated and described previously can form the opaque surface(s) 300 of the clear reticle 30 according to this embodiment. The opaque surface(s) 300 and the aperture(s) 301 of the clear reticle 30 can thus be reversed with respect to the preceding examples, so as to obtain a negative projection of the scattering diagrams on the retina.

Figure 12:
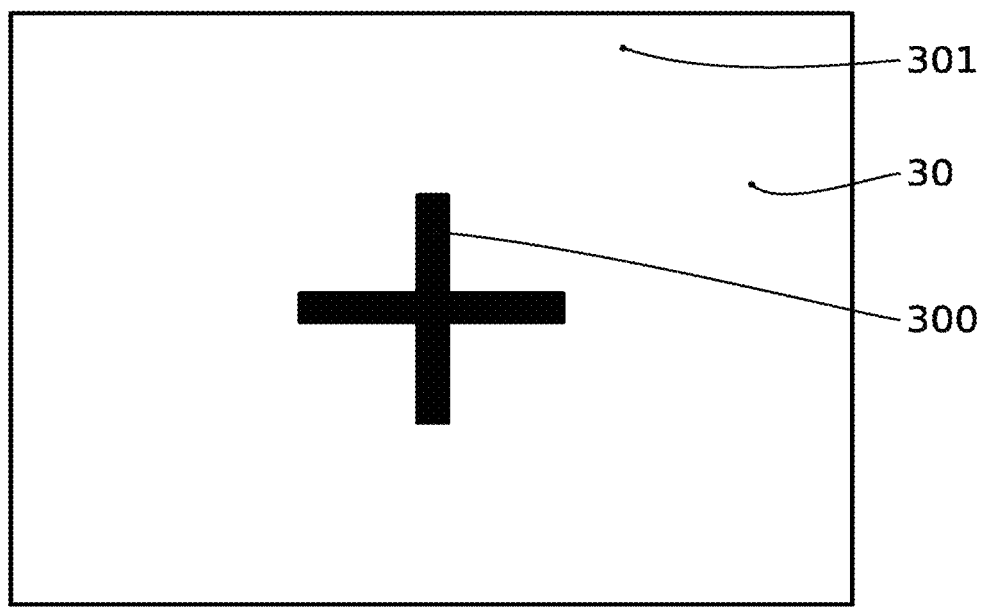
FIG. 12 illustrates a clear reticle according to one embodiment of the present invention.
Figure 13A:
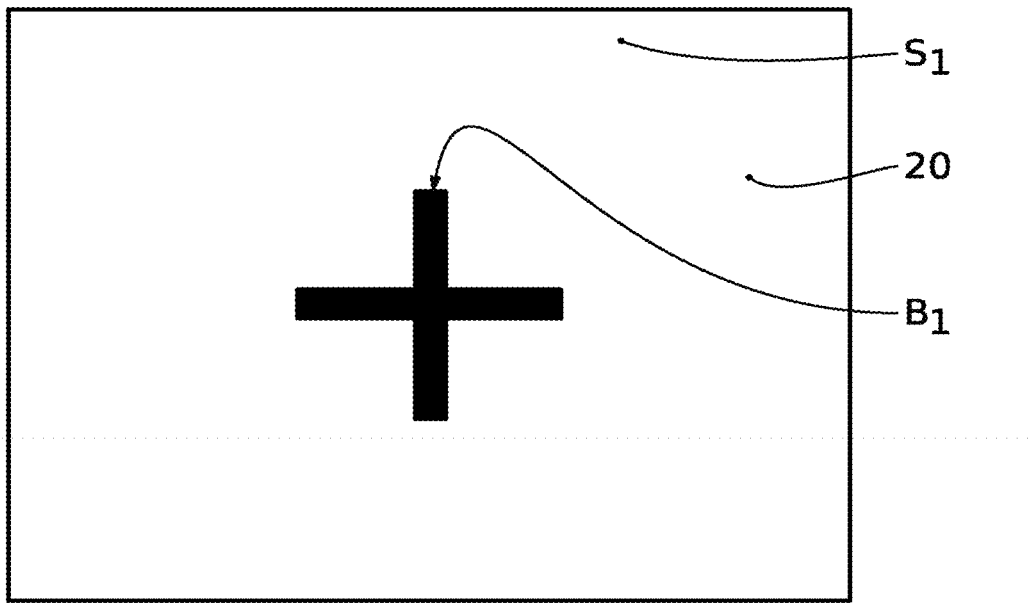
FIG. 13A illustrates the projection onto the retina of a scattering diagram from a scattering particle, through the clear reticle illustrated in FIG. 12.

FIG. 13A illustrates the projection onto the retina 20 of a scattering diagram S1 from a single scattering particle, through the clear reticle 30 illustrated in FIG. 12. This scattering diagram is delimited by a shadow corresponding to the opaque cross present on the clear reticle 30.

In this case, the scattering diagram S1 occupies a major part of the surface of the retina 20. This allows to collect a greater amount of information contained in the scattering diagram. Information relating to the size of the scattering particle as well as its nature can in particular be determined from this scattering diagram S1. The projected shadow B1 formed by the opaque surface 300 allows to determine the position of the scattering particle. It allows to show that only one particle has been detected.

Figure 13B:
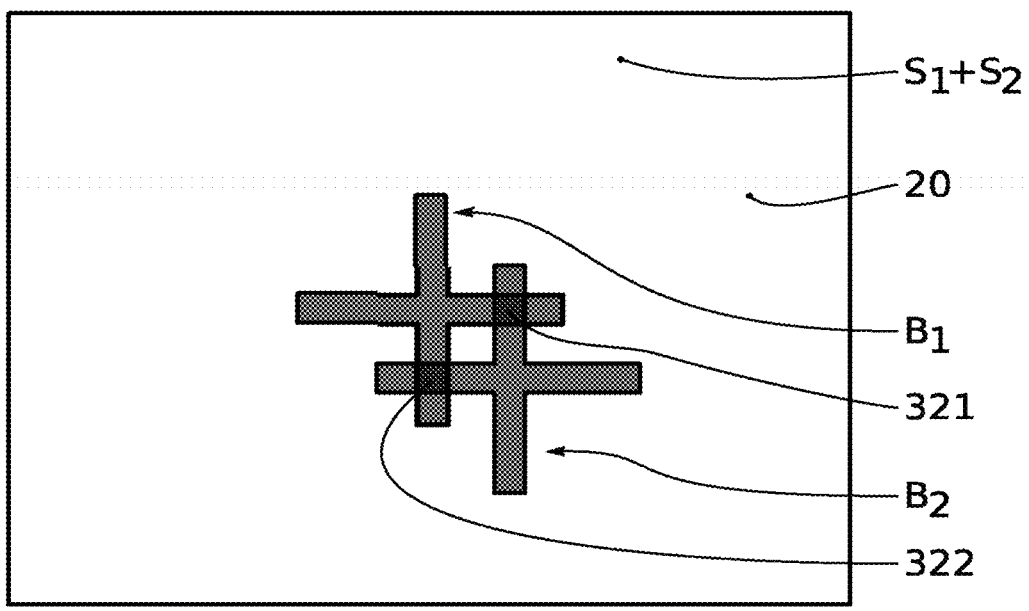
FIG. 13B illustrates the projection onto the retina of two scattering diagrams from two scattering particles, through the clear reticle illustrated in FIG. 12.

FIG. 13B illustrates the projection onto the retina 20 of two scattering diagrams S1, $S_2$ from two scattering particles, through the clear reticle 30 illustrated in FIG. 12.

The rays scattered by these scattering particles reach the retina 20 over a major part of its surface and form the superposition of the scattering diagrams S1+S2. The opaque surface 300 blocks these scattered rays and forms two shadows B1, B2 on the retina 20. The projected shadow B1 corresponds to the first scattering particle and the projected shadow B2 corresponds to the second scattering particle.

The superposition of the scattering diagrams S1+S2 is difficult to exploit. This forms a bright background on the retina mixing the information carried by the diagrams S1, S2. On the other hand, the projected shadows B1, B2 can be exploited so as to determine at least the position, preferably also the size, and preferably also the nature of the scattering particles.

The shadow B1 does not receive any ray scattered by the first particle. On the other hand, the shadow B1 receives at least some of the rays scattered by the second particle. The shadow B1 therefore contains scattering information relating to the second particle.

Similarly, the shadow B2 receives no ray scattered by the second particle. On the other hand, the shadow B2 receives at least in part rays scattered by the first particle. The shadow B2 therefore contains scattering information relating to the first particle.

The superposition zones 321, 322 of the shadows B1, B2 receive neither the scattered rays from the first particle, nor the scattered rays from the second particle. The contrast with respect to the bright background is maximum at these superposition zones 321, 322.

Information relating to the positions of the particles can be determined from the positions of the shadows B1, B2 projected onto the retina 20, and/or the positions of the superposition zones 321, 322 on the retina 20.

Information relating to the size of the particles can be determined from the surfaces of the shadows B1, B2 projected onto the retina 20, and/or the surfaces of the superposition zones 321, 322 and/or the shape ratios of these surfaces on the retina 20.

Information relating to the nature of the particles (for example their refractive index) can be determined from the contrast rate of the shadows B1, B2 projected onto the retina 20.

The size and the refractive index of a particle are typically coupled quantities. They can be evaluated both by analysing the surfaces of the shadows on which the Mie alternations appear (unmixed) as well as by analysing the contrast ratios.

Information relating to the size and the nature of the first particle can be determined from the part of the scattering diagram of this first particle contained in B2. Information relating to the size and the nature of the second particle can be determined from the part of the scattering diagram of this second particle contained in B1.

Thus this embodiment allows to determine a great deal of information relating to the particles.

Figure 13C:
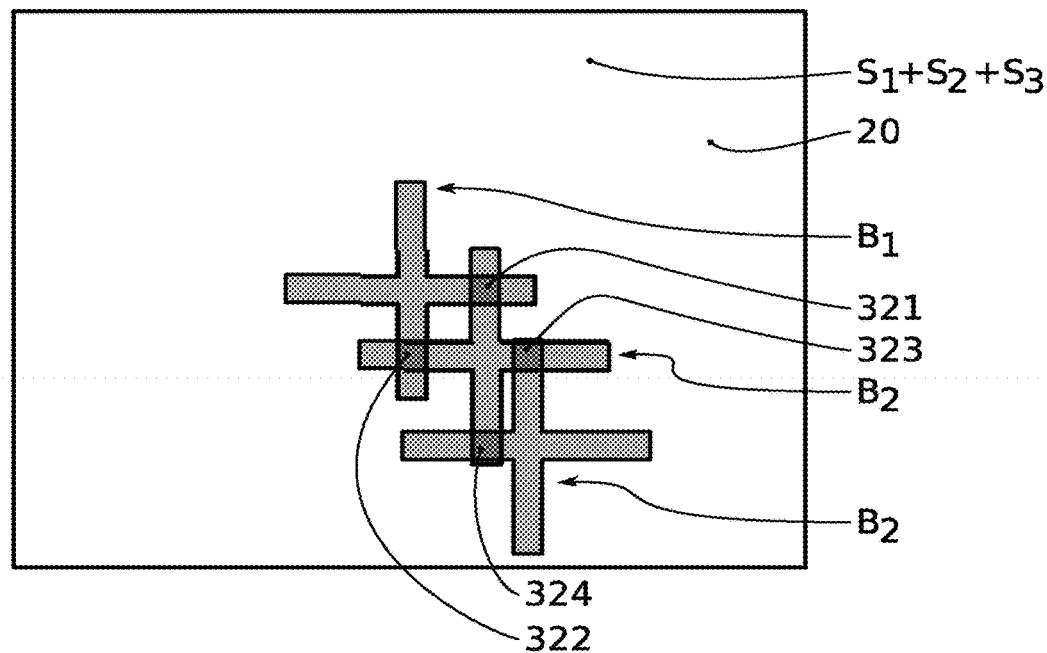
FIG. 13C illustrates the projection onto the retina of three scattering diagrams from three scattering particles, through the clear reticle illustrated in FIG. 12.

FIG. 13C illustrates the projection onto the retina 20 of three scattering diagrams S1, S2, S3 from three scattering particles, through the clear reticle 30 illustrated in FIG. 12.

The superposition of the scattering diagrams S1+S2+S3 is difficult to exploit. This forms a bright background on the retina mixing the information carried by the diagrams S1, S2, S3. On the other hand, the projected shadows B1, B2, B3 can be exploited so as to determine at least the position, preferably also the size, and preferably also the nature of the scattering particles, according to the principle explained above in the case of two scattering particles.

In this case however, only the superposition zones 321, 322, 323 between the shadows B1, B2, B3 are likely to contain a part of the scattering diagram relating to a single scattering particle. In particular, the superposition zones 321, 322 of the shadows B1, B2 receive neither the scattered rays from the first particle, nor the scattered rays from the second particle. On the other hand, the superposition zones 321, 322 receive at least some of the rays scattered by the third particle. These superposition zones 321, 322 therefore contain scattering information relating to the third particle. The superposition zones 323, 324 of the shadows B2, B3 receive neither the scattered rays from the second particle, nor the scattered rays from the third particle. Likewise, the superposition zones 323, 324 receive at least some of the rays scattered by the first particle. These superposition zones 323, 324 therefore contain scattering information relating to the first particle.

Information relating to the positions of the particles can be determined from the positions of the shadows B1, B2, B3 projected onto the retina 20, and/or the positions of the superposition zones 321, 322, 323, 324 on the retina 20.

Information relating to the sizes of the particles can be determined from the surfaces of the shadows B1, B2, B3 projected onto the retina 20, and/or the surfaces of the superposition zones 321, 322, 323, 324 and/or the shape ratios of these surfaces on the retina 20.

Information relating to the nature of the particles can be determined from the contrast rate of the shadows B1, B2, B3 projected onto the retina 20.

The size and the refractive index of a particle are typically coupled quantities. They can be evaluated both by analysing the surfaces of the shadows on which the Mie alternations appear (unmixed) as well as by analysing the contrast ratios.

Information relating to the size and the nature of the first particle can be determined from the part of the scattering diagram of this first particle contained in the superposition zones 323, 324. Information relating to the size and the nature of the third particle can be determined from the part of the scattering diagram of this third particle contained in the superposition zones 321, 322.

Figure 14:
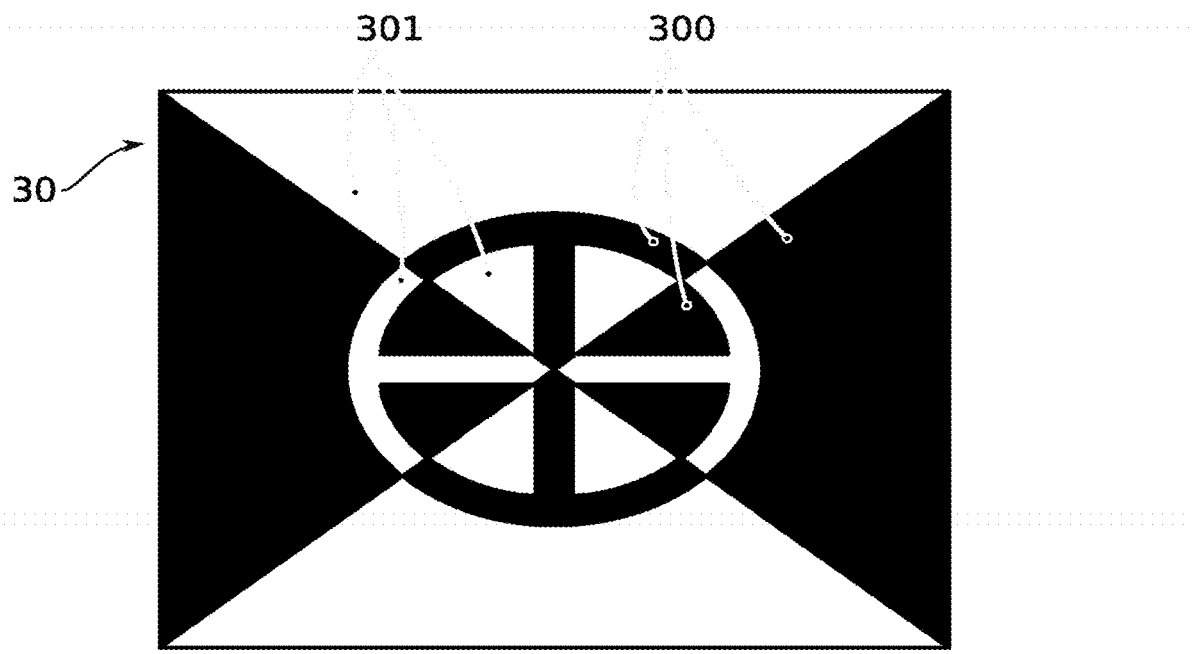
FIG. 14 illustrates a reticle according to one embodiment of the present invention.

According to an embodiment illustrated in FIG. 14, the reticle 30 comprises at least one optical blocking zone 300 (opaque surfaces) and at least one optical passage blocking zone 301 (transparent surfaces). In this example, the reticle carries several zones 300 and several zones 301. The zones 300 and zones 301 are in the same proportion. The total surface of the optical passage zones 301 is equal to the total surface of the optical blocking zones 300, to within X %, with X less than 15%, preferably X less than 10%, and preferably X less than 2%.

This allows to combine the advantages of direct analysis from the parts of the scattering diagrams transmitted through the dark reticle, and the advantages of indirect analysis from the shadows projected through the clear reticle.

Different patterns of transparent surfaces and opaque surfaces, having symmetries or not, can be integrated into the reticle 30. FIG. 14 illustrates an example combining rectilinear and curvilinear slot patterns, and solid or hollow patterns of substantially triangular shape. These patterns preferably alternate opaque portions and transparent portions.

Through Channel

According to one embodiment, the detector 1 comprises a fluidic channel. This fluidic channel is configured to guide the flow of particles to be analysed to the useful detection volume. This optimises the efficiency of the detector.

The fluidic channel preferably passes through the detector, preferably right through and along the optical axis O. The detector thus has improved compactness. FIGS. 15A to 17 illustrate exemplary embodiments of a detector comprising a fluidic channel.

Figure 15A:
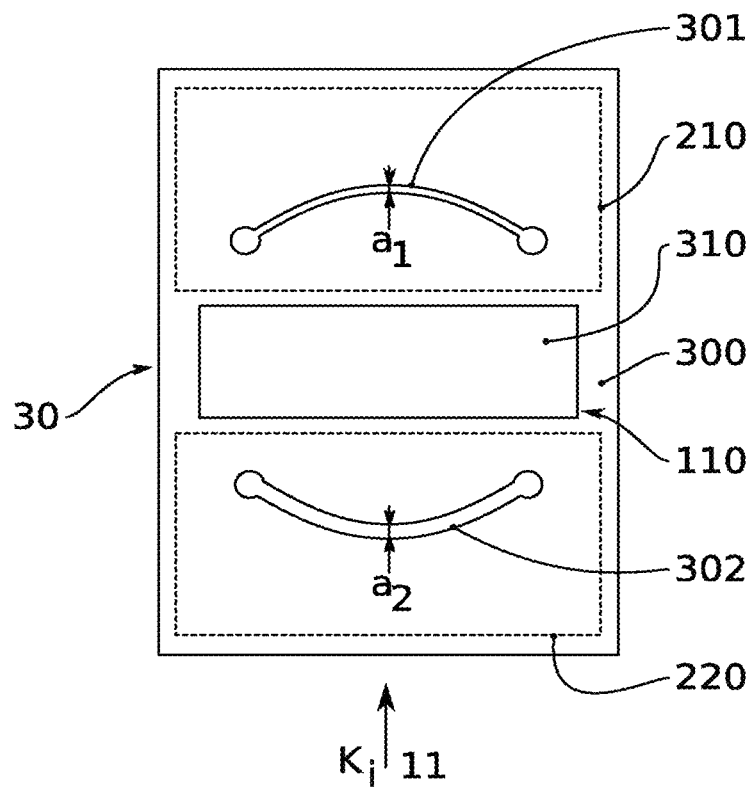
FIG. 15A schematically illustrates a top view of a detector comprising a reticle and a fluidic channel passing through the reticle, according to one embodiment of the present invention.
Figure 15B:
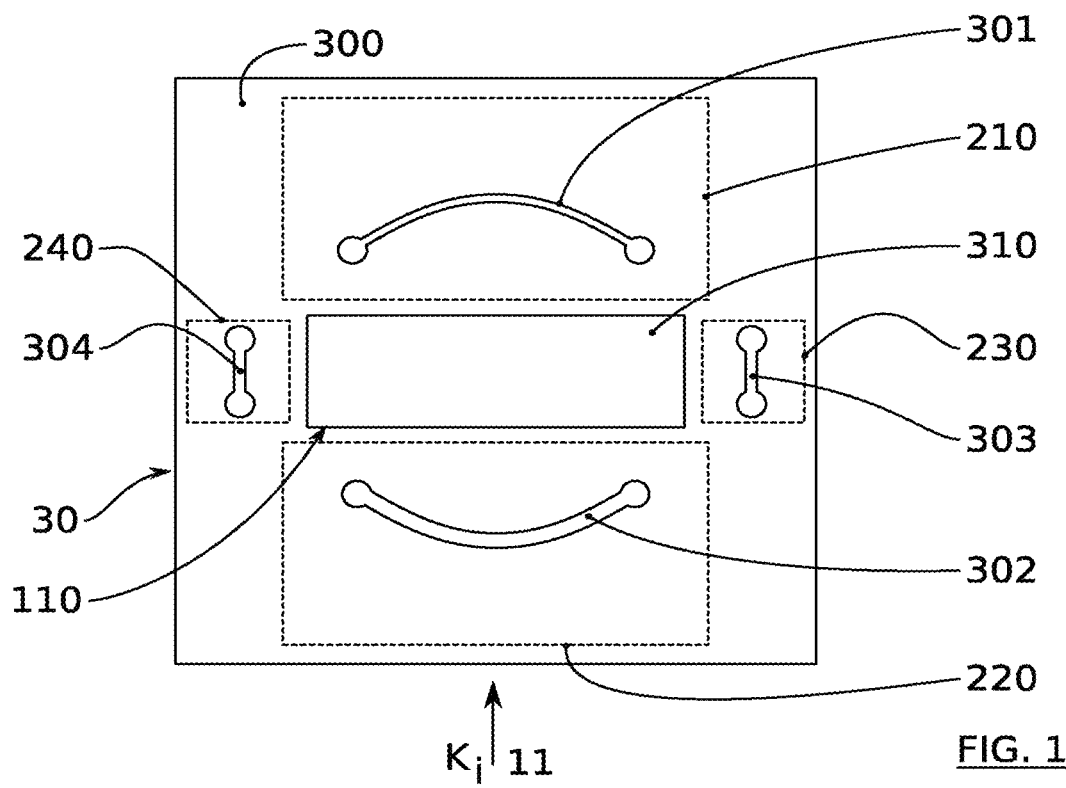
FIG. 15B schematically illustrates a top view of a detector comprising a reticle and a fluidic channel passing through the reticle, according to another embodiment of the present invention.

As illustrated in FIGS. 15A and 15B for example, this fluidic channel 110 can emerge at an orifice 310 through the dark reticle 30. The orifice 310 is for example centred on the reticle 30. Alternatively, the orifice 310 can be located on one side of the reticle. It can have a square, rectangular, round or other section.

In the case of a fluidic channel 110 passing through the reticle 30, the reticle 30 preferably comprises at least two apertures 301, 302 located on either side of the orifice 310 (FIG. 15A). The two apertures 301, 302 are preferably disposed along the axis of propagation of the incident rays K.

The two apertures 301, 302 may have different dimensions $a_1$, $a_2$. They may correspond to different zones 210, 220 of the retina, located substantially directly above the apertures 301, 302 along the optical axis. This allows to optimise the detection of the scattered rays according to the direction of the incident rays K. In FIG. 15A, the incident rays $k_i$ propagate from the primary source towards the first aperture 301, in the plane of the sheet. When a scattering particle is above the orifice 310, part of the scattered rays is scattered in the direction of propagation of the incident rays $k_i$, while part of the scattered rays is backscattered, in the opposite direction. The intensity of the "backscattered" part is lower than that of the "front-scattered" part (in the direction of propagation). The first aperture 301 can therefore have a width $a_1$ smaller than the width $a_2$ of the second aperture 302. This allows to improve the resolution of the first part of the scattering diagram projected through the first aperture 301, and to improve the detection of the second part of the scattering diagram projected through the second aperture 302.

The first zone 210 of the retina can comprise photodetectors adapted to the front scattering conditions. The second zone 220 of the retina may comprise photodetectors adapted to the backscattering conditions.

The front scattering is indeed generally brighter than backscattering, which is generally not very bright. Consequently, the first zone 210 can comprise relatively smaller and more photodetectors, while the second zone 220 can comprise relatively larger and more sensitive photodetectors. This allows to improve the resolution of the first part of the scattering diagram formed on the first zone 210, and to improve the detection of the second part of the scattering diagram formed on the second zone 220.

The apertures 301, 302 and zones 210, 220 of the retina can thus be adapted according to the lighting and scattering conditions.

FIG. 15B shows a more general embodiment where the reticle 30 comprises four apertures 301, 302, 303, 304 and where the retina comprises four corresponding zones 210, 220, 230, 240. The apertures 301, 302, 303, 304 and the zones 210, 220, 230, 240 are distributed around the through fluidic channel 110, in planes normal to the optical axis along which the channel 110 extends, that is to say in planes parallel to the plane of the sheet. The two apertures 301, 302 are preferably disposed along the axis of propagation of the incident rays $k_i$, as in the previous embodiment. The third and fourth apertures 303, 304 are preferably disposed on either side of the axis of propagation of the incident rays $k_i$.

The first aperture 301 is thus dedicated to front scattering, the second aperture 302 is thus dedicated to backscattering, and the third and fourth apertures 303, 304 are thus dedicated to lateral scattering.

In general, the number of apertures of the reticle and/or of zones of the retina of the detector according to the invention may vary. This number may for example be odd. The aperture pattern(s) are not necessarily symmetrical on either side of the orifice. They are preferably optimised according to the scattering zone (frontal, lateral, backscattering).

Figure 16:
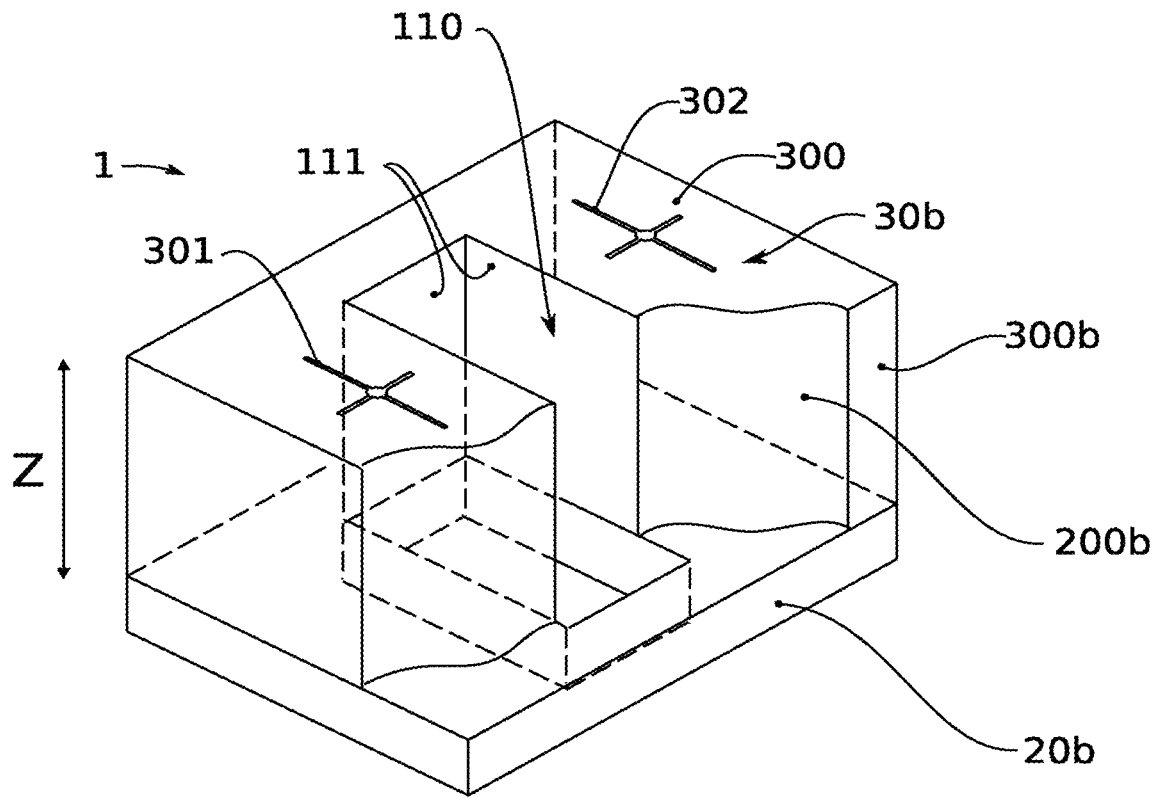
FIG. 16 schematically illustrates in perspective view a detector comprising a reticle and a fluidic channel passing through the reticle, according to another embodiment of the present invention.

A detector 1 comprising a through fluidic channel 110 is illustrated in FIG. 16. The fluidic channel 110 passes through the retina 20, the transparent block 200 and the dark reticle 30 over the entire height of the detector 1. Each element (retina, block, reticle) is for example previously drilled and then assembled so as to form the fluidic channel. The walls 111 of the fluidic channel 110 are thus formed directly within the transparent block 200 and the retina 20.

The section of this fluidic channel 110 has dimensions comprised between 100 µm and 2 mm. This section can have a rectangular, square, circular, elliptical, oblong shape, etc.

In this non-limiting example, the patterns of the apertures 301, 302 of the dark reticle 30 are formed by at least one pinhole and/or at least one slot, arranged for example in the shape of a cross as illustrated in FIG. 6D. The apertures 301, 302 are advantageously distributed on either side or around the through fluidic channel 110.

According to this embodiment, the structural element maintaining the dark reticle at the distance Z from the retina is a transparent block and this transparent block is pierced so as to form the channel. Alternatively, the structural element can be in the form of spacers or sidewalls. In this case (not shown), additional internal walls allow to form the channel.

Preferably, the walls 111 of the channel 110 are opaque or covered with an opaque coating. This prevents parasitic light rays from reaching the retina.

Figure 17:
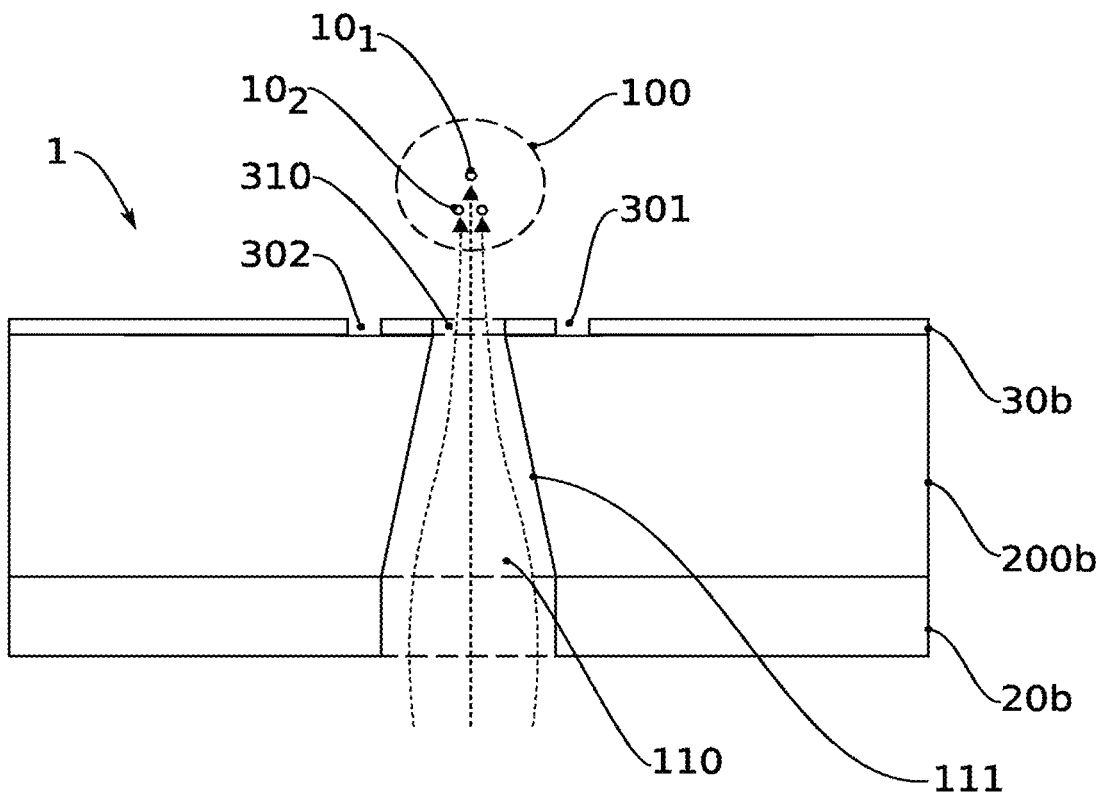
FIG. 17 schematically illustrates in section a detector comprising a reticle and a fluidic channel passing through the reticle, according to another embodiment of the present invention.

According to an embodiment illustrated in FIG. 17, the section of the channel 110 is not constant along the height of the detector 1, that is to say along a direction substantially perpendicular to the main plane wherein extends the retina 20. In particular, the walls 111 can be inclined so as to reduce the section of the channel 110 at the orifice 310. Thus, the inlet of the channel 110 has a section greater than that of the orifice 310 forming the outlet of the channel 110. The channel therefore forms a conical particle injection nozzle. This allows to concentrate and accelerate the flow of particles $10_1$, $10_2$ in the useful detection volume 100. The sensitivity of the detector 1 is thereby improved.

The particle injection nozzle can alternatively have a pyramidal shape with a square base, or a constriction of any shape.

Manufacturing Method

FIGS. 18A to 18G illustrate steps of a method for manufacturing a detector comprising a dark reticle and a through channel. In this embodiment, the structural element of the detector is a transparent block. Of course, additional steps may be interspersed between the steps mentioned below.

A first step consists in providing 400 a transparent substrate 40. This substrate 40 can be made of glass, for example Borofloat 33 glass. It can be in the shape of a plate with a diameter of 200 mm and a thickness Z=725 µm.

Figure 18A:
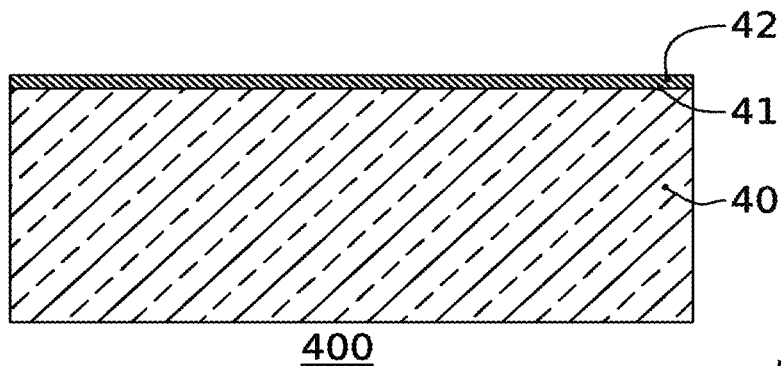
FIGS. 18A to 18G schematically illustrate steps of a method for manufacturing a detector according to one embodiment of the present invention.

An opaque layer 42 is deposited over the entire plate. This opaque layer 42 can be made of metal, for example gold (Au), and have a thickness of the order of 100 nm. A tie layer 41, for example made of titanium (Ti) 10 nm thick, can be deposited prior to the deposition of the opaque layer 42 (FIG. 18A). The opaque layer 42 may alternatively be made of copper (Cu), of aluminium-silicon alloy (AlSi), or carbon (C).

Figure 18B:
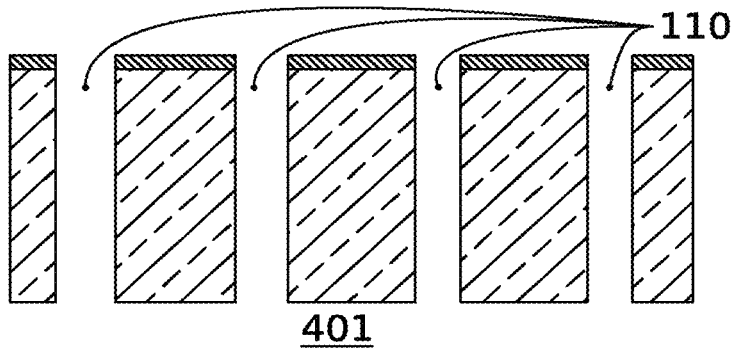

A second step consists in etching 401 a plurality of channels 110 over the entire thickness of the substrate 40, for example by deep laser etching (FIG. 18B).

Figure 18C:
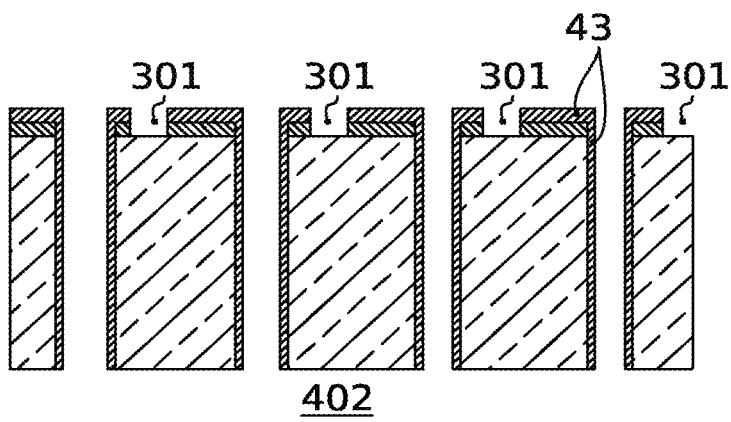

A third step consists in forming 402 apertures 301 by photolithography (FIG. 18C). In a known manner, a layer of photosensitive resin 43 is deposited then exposed through a mask comprising aperture patterns, so as to transfer these aperture patterns. The exposed resin layer is then developed in order to partly expose the opaque layer 42 at the transferred aperture patterns. An etching, for example by wet process, of the opaque layer 42 at the exposed parts is then carried out so as to form the apertures 301 having said aperture patterns. The resin layer is then removed (step called "stripping"). The dark reticle(s) are thus formed.

Figure 18D:
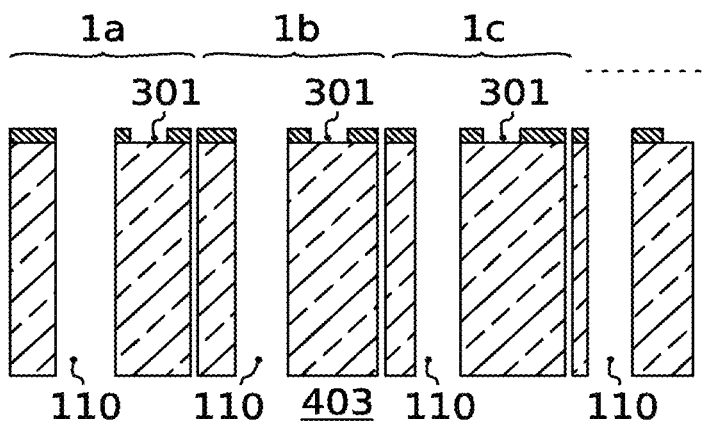

A fourth step consists in separating 403 the different transparent blocks 1a, 1b, 1c each comprising a channel 110 and at least one aperture 301, so as to form a plurality of detectors (FIG. 18D). This step can be done by laser drilling, for example using a femtosecond laser.

Figure 18E:
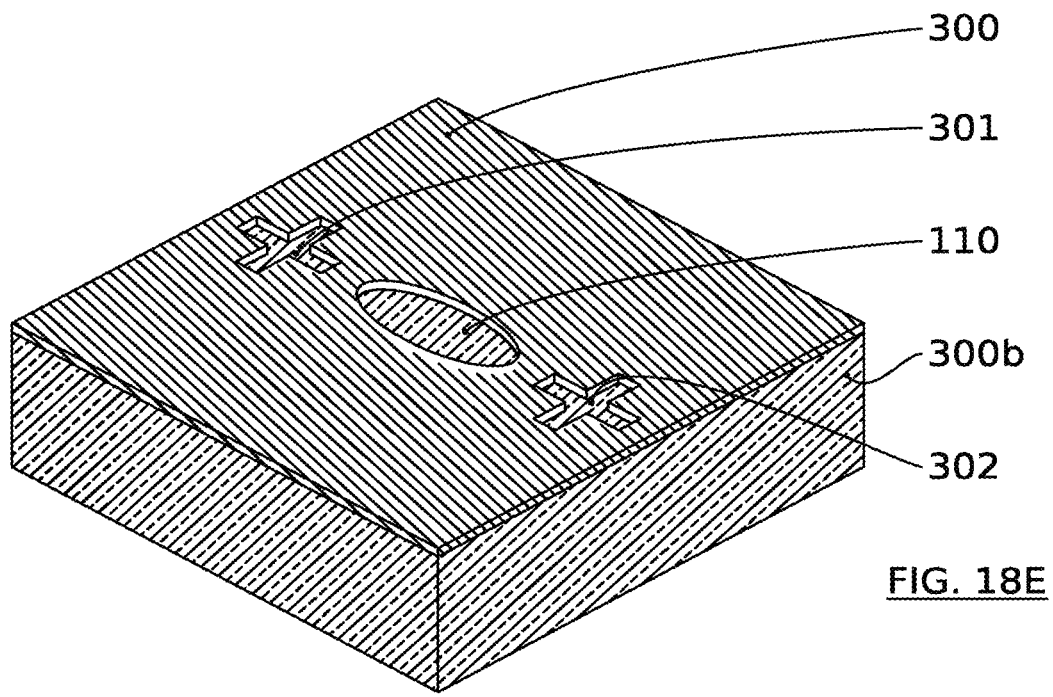

An optional cleaning step can be carried out, so as to eliminate etching or drilling residues on the free surfaces of the transparent block (at the apertures 301, of the channel 110, of the lateral surfaces 300b, as illustrated in FIG. 18E).

Figure 18F:
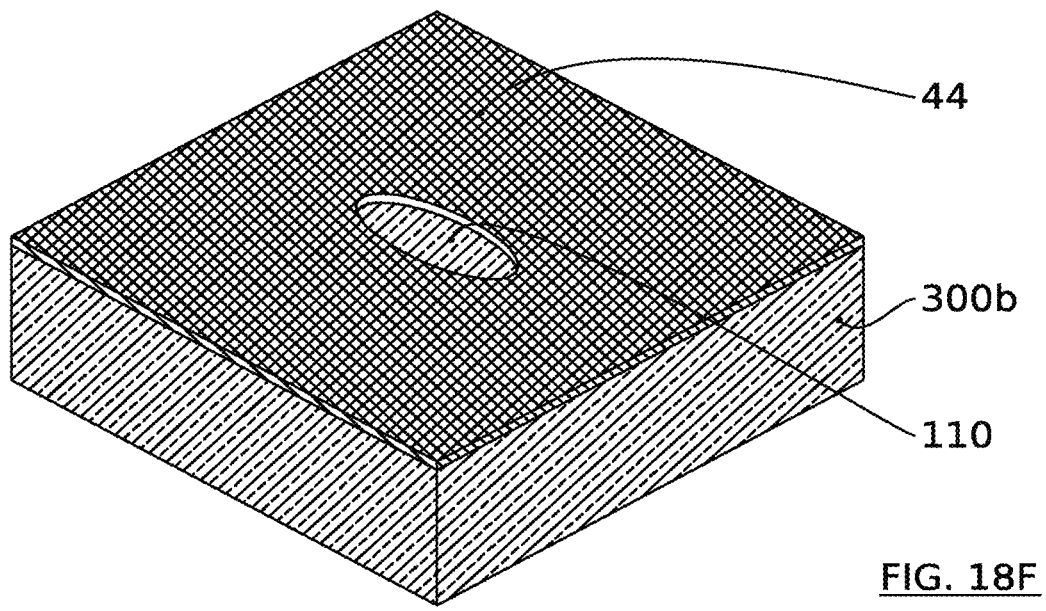

Preferably but optionally, a step of opacifying the walls of the channel 110 and the lateral surfaces 300b is carried out. A preliminary masking of the surface 300 and of the apertures 301, 302 of the dark reticle is carried out. A masking or protective layer 44 is for example deposited. The walls of the channel 110 and the lateral surfaces 300b are then made opaque, for example by spraying black paint (FIG. 18F).

Figure 18G:
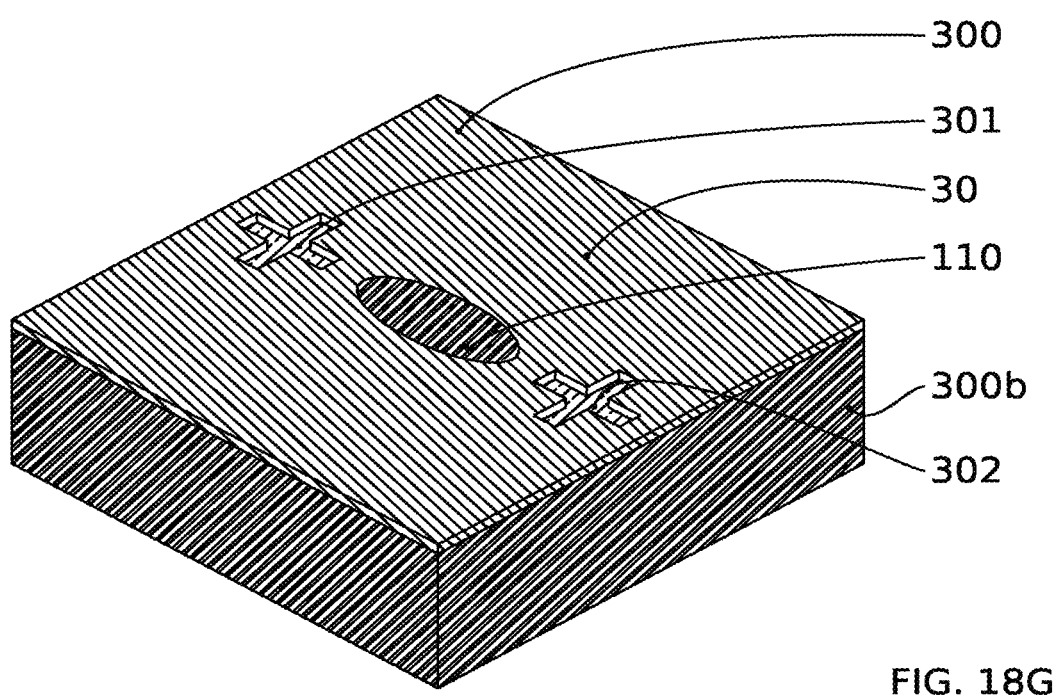

The masking layer is then removed. The transparent block thus obtained has opaque lateral surfaces 300b. It is surmounted by a dark reticle 30 comprising an opaque reflective surface 300 and apertures 301, 302. It is further traversed by a channel 110 delimited by opaque walls (FIG. 18G).

According to an alternative embodiment, the photosensitive resin is black and absorbent. The stripping and opacification steps are thus advantageously eliminated. The dark reticle 30 thus obtained comprises an opaque absorbing surface 300.

Figure 19A:
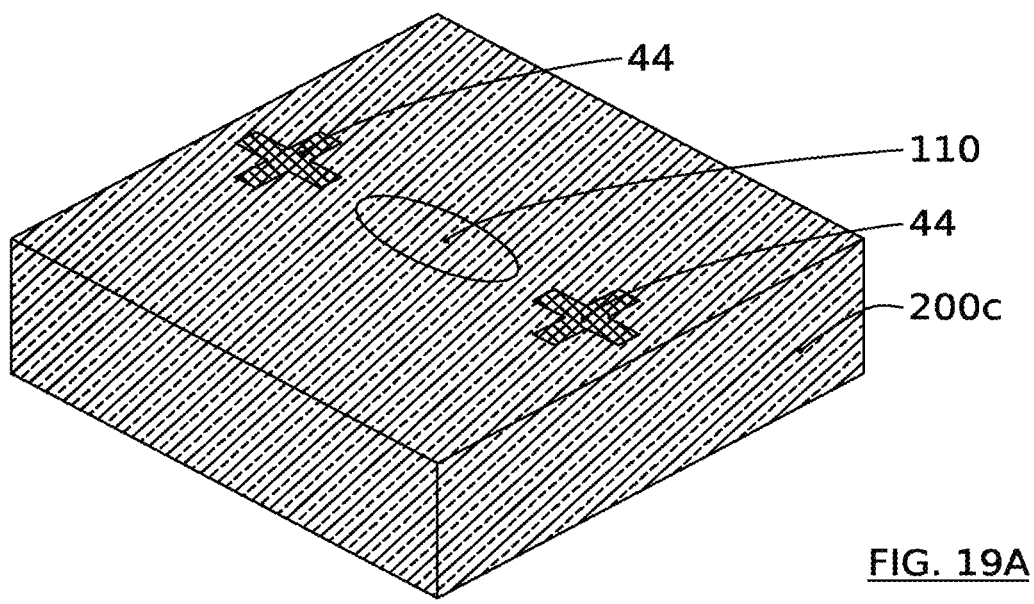
FIGS. 19A and 19B schematically illustrate steps of a method for manufacturing a detector according to another embodiment of the present invention.
Figure 19B:
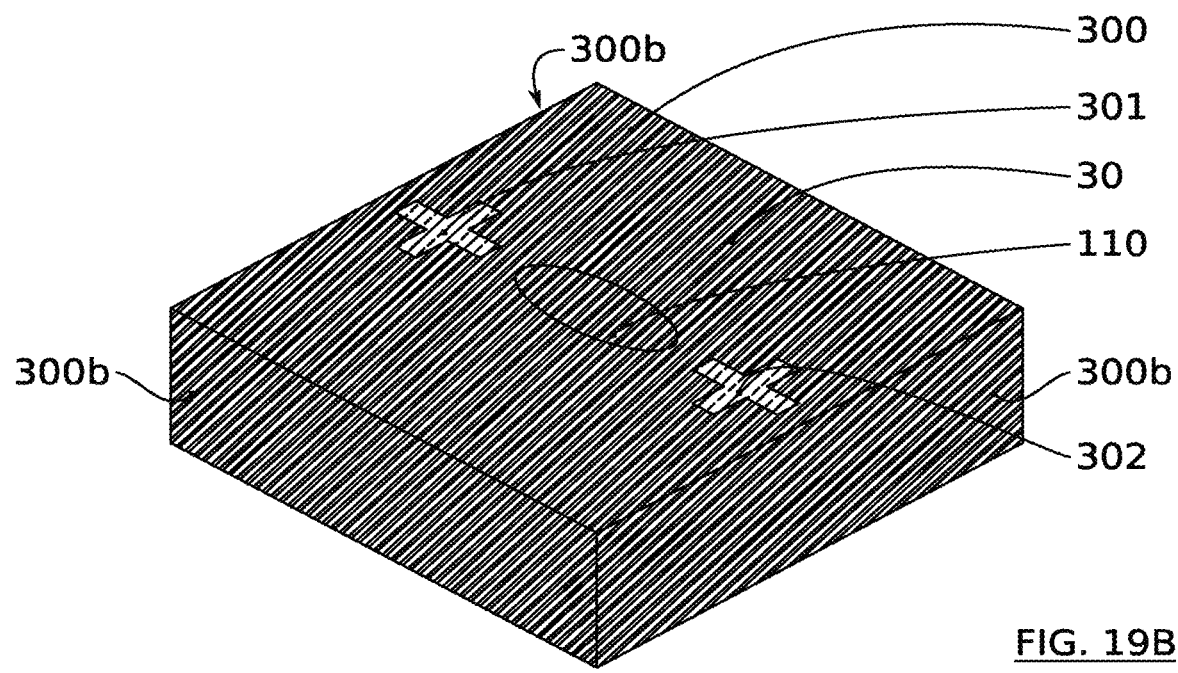

According to another embodiment illustrated in FIGS. 19A, 19B, the transparent block 200c is formed from a moulded transparent polymer. The channel 110 is therefore directly obtained at the end of the moulding.

According to this example, covers 44 having the shape of the aperture patterns are then deposited on either side of the channel 110 (FIG. 19A). These covers 44 can be made from a protective film cut and glued to the surface of the transparent block 200c.

A step of opacification by spraying paint is then carried out. All the surfaces can thus be covered with absorbent black paint, with the exception of the surfaces masked by the covers 44. By removing the covers 44, the transparent block thus obtained has opaque lateral surfaces 300b. It is surmounted by a dark reticle 30 comprising an opaque absorbing surface 300 and optical apertures 301, 302. It is further traversed by a channel 110 delimited by opaque walls (FIG. 19B).

According to another possibility, the opaque surface 300 is formed by gluing an opaque plastic film previously cut at the orifice of the channel and the optical apertures.

The transparent block thus obtained is then assembled to a retina (CMOS imager) so as to form the detector. An optical glue is for example deposited on the face of the imager comprising the photodetectors. The transparent block is then placed opposite this face, and aligned with respect to the imager preferably using the alignment patterns provided. This step can be done using a machine called "pick and place" machine of the type supplied by the Datacon company, for example.

The block is then glued and sealed to the imager by thermal crosslinking of the glue. The manufacturing cost of such a detector is advantageously reduced.

Lighting Beam

The detector according to the invention can be coupled with different lighting sources of the useful detection volume 100. These lighting sources are described below. They can form with the detector a detection system according to the present invention. They can also constitute a separable aspect of the detector and which can be operated independently of the detector.

Figure 20A:
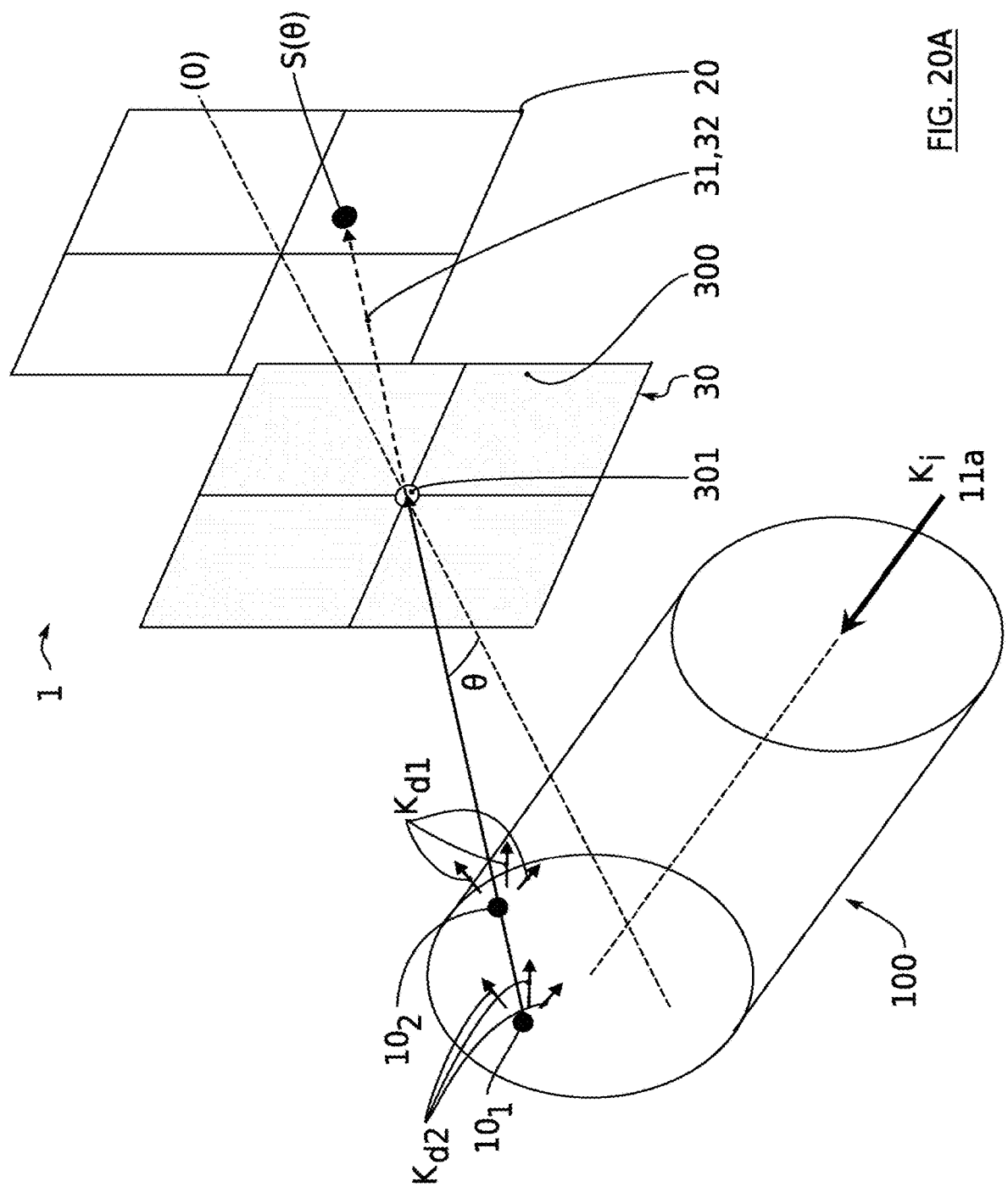
FIG. 20A schematically illustrates in perspective view a system comprising a detector according to one embodiment of the present invention and a primary source according to a first embodiment.

FIG. 20A illustrates a cylindrical incident beam $k_i$, which is for example collimated, emitted by a source 11a. The resulting useful detection volume 100 is thus cylindrical. By associating such a useful detection volume 100 with a detector 1 comprising a pinhole-shaped aperture 301, the counting of the particles $10_1$, $10_2$ can be biased. This bias can in particular occur when the particles $10_1$, $10_2$ and the pinhole 301 are substantially aligned in the same direction, that is to say when $\theta_{ij} < \delta\theta$, as illustrated in FIG. 20A. In this case, the scattered parts 31, 32 through the pinhole form a single scattered beam, resulting in a single pattern or a single spot $S(\theta)$ on the retina 20. The scattering diagrams of the two particles $10_1$, $10_2$ are in part coincident. It is then very difficult to distinguish the two particles $10_1$, $10_2$. A solution may consist in using a more complex aperture pattern, for example as illustrated in FIGS. 6C to 6J.

Figure 20B:
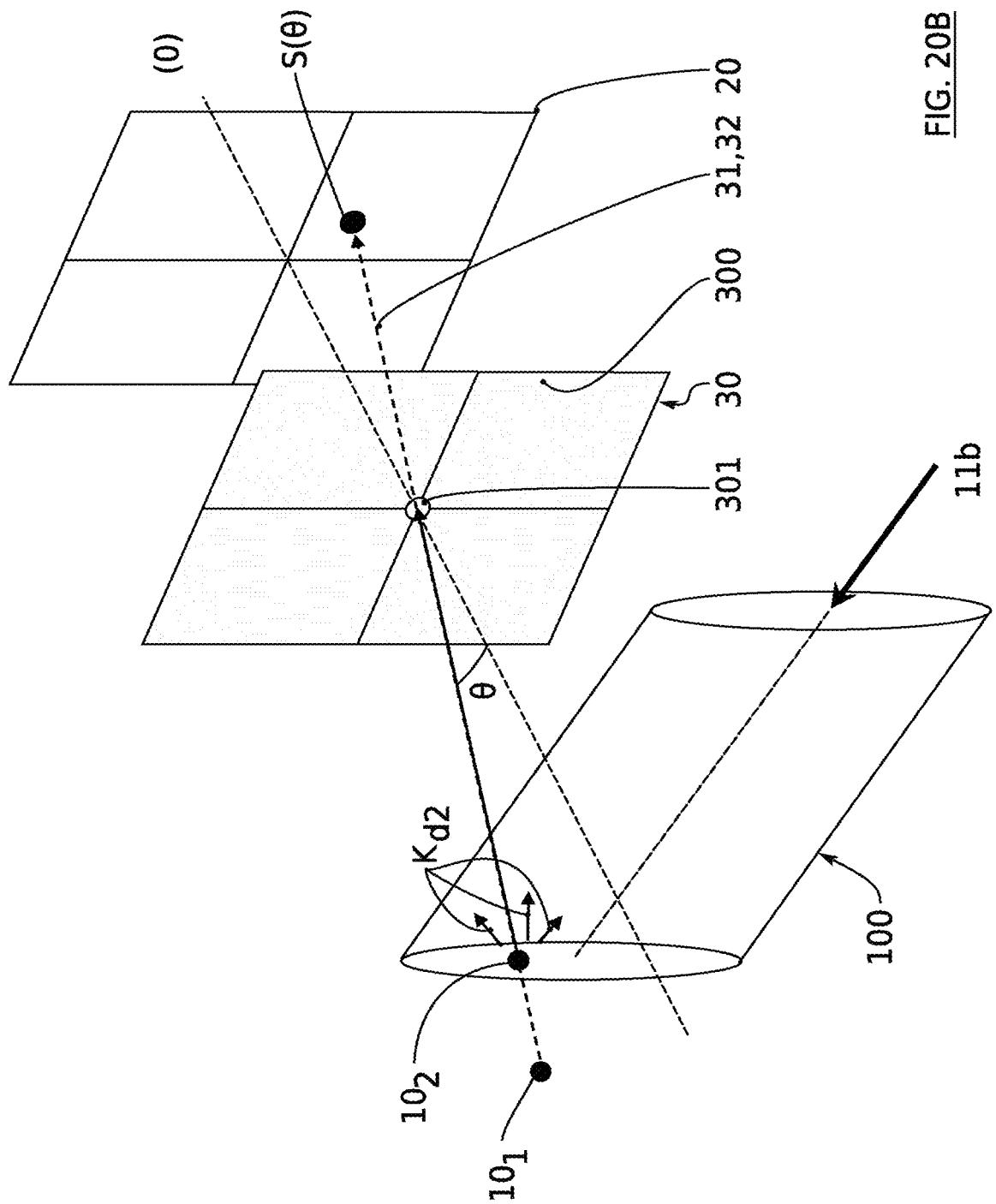
FIG. 20B schematically illustrates in perspective view a system comprising a detector according to one embodiment of the present invention and a primary source according to a second embodiment.

An alternative solution illustrated in FIG. 20B consists in modifying the illumination beam and, consequently, the useful detection volume 100. A source 11b emitting an elliptical or flattened beam can reduce or even eliminate the risk that two particles $10_1$, $10_2$ aligned with the pinhole scatter simultaneously. This reduces the risk of superposition of the signatures of the particles $10_1$, $10_2$ on the retina. The section of this beam therefore has a large dimension and a small dimension, and the large dimension is preferably perpendicular to the optical axis O. The ratio between the large dimension and the small dimension is for example of the order of 5:1, preferably this ratio is of the order of 10:1.

The direction of propagation of the source beam is not necessarily parallel to the plane of the dark reticle 30. It is nevertheless selected so as not to directly dazzle the retina 20 of the detector through the dark reticle 30. According to one possibility, the source beam can be focused, divergent or convergent.

According to one embodiment, the illumination of the particle(s) within the useful detection volume comprises several wavelengths or colours. This allows in particular to refine the analysis of a particle, and in particular to reduce the uncertainties when estimating its size. Such an analysis by colours is for example described in the publication "S. Wang, X. Xiao, T. Deng, A. Chen, M. Zhu, A Sauter mean diameter sensor for fire smoke detection, Sensors & Actuators: B. Chemical 281 (2019) 920-932".

According to one example, the useful detection volume is illuminated by two (or more) collinear beams in the same direction, and of different wavelengths. Alternatively, a single beam called "white" beam, the spectral width of which can extend over the range of the visible spectrum, illuminates the useful detection volume.

Such lighting sources called collinear polychromatic lighting sources can be associated with a detector comprising a colour-sensitive retina. The photodetectors of the retina can for example comprise red, green or blue coloured filters. In particular, "red" photodetectors (that is to say comprising a red filter) can be alternated with "blue" photodetectors and "green" photodetectors. The set of "red", "green" and "blue" photodetectors preferably forms a Bayer mosaic. It is thus possible to obtain three "coloured" scattering diagrams, relating to the three colours of the photodetectors. Such a detector allows to perform a colour analysis of the particles to be detected.

Figure 21A:
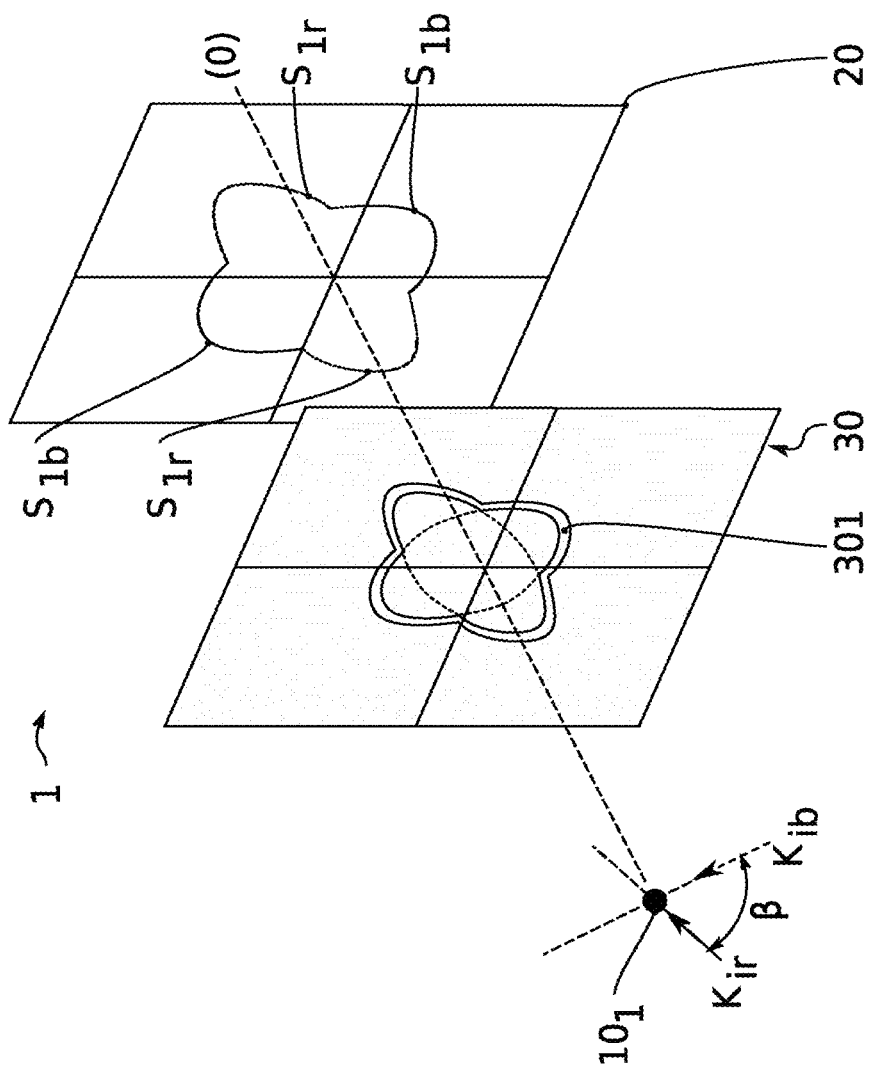
FIG. 21A schematically illustrates in perspective view a system comprising a detector and two primary sources according to one embodiment of the present invention.

FIG. 21A shows another configuration allowing to perform a colour analysis of the particles to be detected.

According to this embodiment, the particle(s) to be detected are illuminated by at least two beams $k_{ir}$, $k_{ib}$ of different colours having different directions of propagation. These beams can have a non-zero angle $\beta$ between their directions of propagation. These beams may optionally be collinear and counter-propagating ($\beta=180°$). The beams can be three or more in number. They can have colours in the absorption range of silicon, in particular in the visible, for example green, blue, red, and/or in the near UV and/or in the near infrared (NIR).

The detector 1 associated with this lighting configuration advantageously comprises an aperture 301 allowing to separate the scattered rays according to the directions of propagation of the incident beams. The geometry of the pattern of the aperture 301 is selected according to these directions of propagation.

In the example illustrated in FIG. 21A, the particle 101 is illuminated by two beams $k_{ir}$, $k_{ib}$ having propagation directions parallel to the plane of the dark reticle 30 and forming therebetween an angle $\beta$ approximately equal to 90°. The pattern of the aperture 301 can therefore be formed by joining together a part of a first ellipse aligned (along its major axis) with the direction of propagation of the beam $k_{ir}$, and a part of a second ellipse aligned (along its major axis) with the direction of propagation of the beam $k_{ib}$. The major axes of the first and second ellipses form therebetween the angle $\beta$. The first ellipse is optimised for the colour of the beam $k_{ir}$, for example red, and the second ellipse is optimised for the colour of the beam $k_{ib}$, for example blue. This allows to optimise the transmission of the coloured Mie lobes for the particle $10_1$. The scattering diagram $(S_{1r}, S_{1b})$ formed on the retina 20 is therefore a superposition of the two coloured scattering diagrams $S_{1r}, S_{1b}$.

The two coloured scattering diagrams $S_{1r}$, $S_{1b}$ are offset by the angle β in the plane of the retina. They also have an optimal light intensity, due to the alignment of the major axes of the ellipses with the directions of propagation of the source beams. This allows to distinguish the two coloured scattering diagrams $S_{1r}$, $S_{1b}$ in an optimal way. Such a detector therefore also allows to perform a colour analysis of the particles to be detected.

Figure 21B:
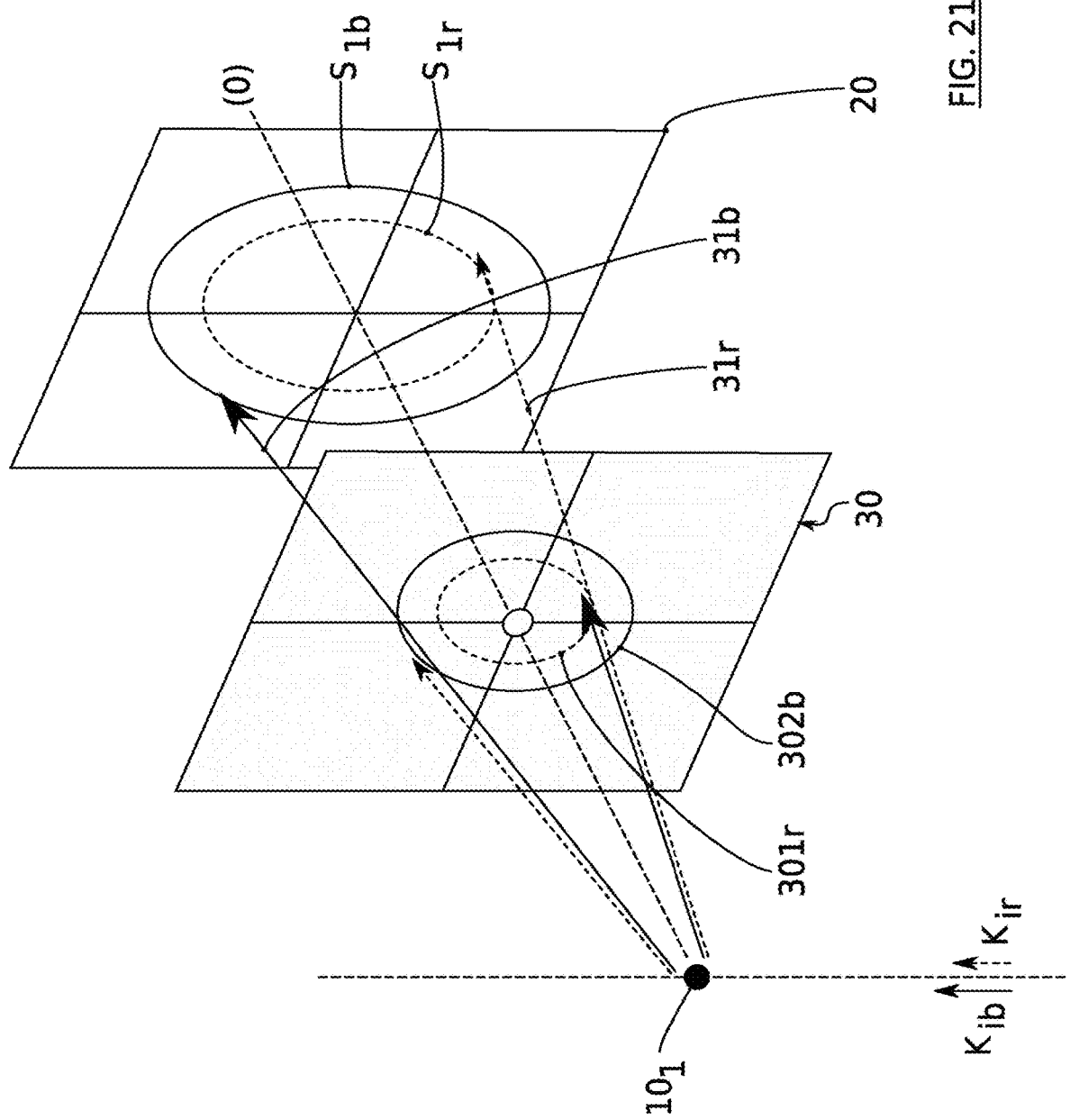
FIG. 21B schematically illustrates in perspective view a system comprising a detector and two primary sources according to another embodiment of the present invention.

Another embodiment of a system comprising a detector and colour sources is shown in FIG. 21B. According to this example, the dark reticle 30 comprises at least two coloured apertures 301r, 302b, adapted to the colours of the incident beams $k_{ir}$, $k_{ib}$. These apertures 301r, 302b are separated from each other and can have different patterns. They form, for example, rings or concentric ellipses, as illustrated in FIG. 21B. In practice, the apertures 301r, 302b can be covered by a coloured filter. For example, the beam $k_{ir}$ is red and the aperture 301r is covered with a red filter which allows to transmit, preferably only, the scattered rays 31r of red colour. The beam $k_{ib}$ is blue and the aperture 302b is covered with a blue filter which allows to transmit, preferably only, the scattered rays 31b of blue colour. According to another example, the beam $k_{ir}$ is NIR and the aperture 301r is covered with an NIR filter which allows to transmit, preferably only, the scattered rays 31r of NIR colour. The beam $k_{ib}$ is red and the aperture 302b is covered with a red filter which allows to transmit, preferably only, the scattered rays 31b of red colour. Red and NIR filters can be formed by inexpensive layers. This reduces the cost of the detector. According to another more general example, the beam $k_{ib}$ has a colour associated with a first wavelength and the beam $k_{ir}$ has a colour associated with a second wavelength with the first wavelength strictly less than the second wavelength.

Each aperture can thus be specific to one of the colours of the light source. Therefore, coloured scattering diagrams $S_{1b}$, $S_{1r}$ of the particle $10_1$ are projected onto the retina 20 of the detector 1. These coloured diagrams $S_{1b}$, $S_{1r}$ are separated on the retina. Such a detector therefore allows to carry out a colour analysis of the particles to be detected, even if the retina is not sensitive to colour. This detector can also work with different polychromatic sources, for example collinear polychromatic sources, as shown in FIG. 21B. It is also possible to use a white beam and limit the analysis by colours to only a few colours.

The invention is not limited to the embodiments described above.

In general, the examples of detectors comprising an aperture giving spots T1, T2 can be transposed, except incompatibility, to detectors comprising a dark surface giving shadows B1, B2, and vice versa. Thus the features, technical effects and advantages mentioned with regard to the embodiments with dark reticle are valid for the embodiments with clear reticle.

The invention claimed is:

1. An optical particle detector configured to simultaneously detect at least a first particle and at least a second particle within a useful detection volume configured to accommodate a fluid transporting particles and to be traversed by incident light rays emitted by at least one primary source, said first and second particles respectively forming first and second secondary sources emitting respectively, the first and second secondary sources being located in the useful detection volume and the first and second secondary sources scattering a part of the incident light rays, first scattered light rays and second scattered light rays, said detector comprising a retina formed by a plurality of photodetectors configured to receive scattered light rays,
a reticle interposed between the useful detection volume and the retina, said reticle comprising:
at least an optical passage zone allowing passage towards the retina of a first part of the first scattered light rays and of a second part of the second scattered light rays, said parts of the first and second scattered light rays being respectively called first and second scattered parts,
at least an optical blocking zone preventing passage towards the retina of a third part of the first scattered light rays and of a fourth part of the second scattered light rays,
at least one of said optical passage and blocking zones:
being separated from the retina by a minimum distance Z taken along an optical axis normal to the retina,
further having at least one dimension a taken in a direction transverse to the optical axis,
the reticle and the retina being configured so that:
the first part is received by a first set of photodetectors whose distribution delimits on the retina a first figure taken from a first spot and a first shadow, and
the second part is received by a second set of photodetectors, the distribution of which delimits on the retina a second figure taken from a second spot and a second shadow, said second figure being at least partly distinct from the first figure, wherein
an angle between the first and second parts emitted from the first and second particles, respectively, is defined as $\theta_{ij}$ whose value is at least equal to an angular resolution δθ of the detector.

2. The optical detector according to claim 1, wherein the reticle and the retina are configured so that the second figure is offset relative to the first figure on the retina, a smallest distance $L_s$ corresponding to the offset between the two figures being greater than or equal to 2*Lpix, the first and second parts passing through the at least one optical passage zone together defining the angle $\theta_{ij}$ whose value is at least equal to the angular resolution δθ of the detector, and Lpix being a pitch between two adjacent photodetectors of the retina.

3. The optical detector according to claim 2, wherein said dimension a is defined as $$a = (Z.\tan(\delta\theta) - L_s)\frac{Z_p}{Z + Z_p}$$

where Zp is a minimum distance separating the useful detection volume from at least one of said optical passage and blocking zones.

4. The optical detector according to claim 1, wherein the reticle and the retina are configured so as to generate on the retina at least one first scattering diagram formed by the first part and a second scattering diagram formed by the second part, said at least first and second scattering diagrams each forming at least one peak corresponding to the at least one optical passage zone and each having a base, the bases of each scattering diagram being offset on the retina by a separation distance $L_{Bases} \geq 2*Lpix$, the first and second parts passing through the optical passage zone together defining the angle $\theta_{ij}$ whose value is at least equal to the angular resolution δθ of the detector, and Lpix being a pitch between two adjacent photodetectors of the retina.

5. The optical detector according to claim 4, wherein the peak of each diagram comprises at least one top, the base being located at a height of the peak equal to 10% of a height of the top.

6. The optical detector according to claim 1, wherein the at least one optical passage zone comprises at least one pattern selected from a pinhole and a slot.

7. The optical detector according to claim 1, wherein the at least one optical passage zone comprises at least one pinhole pattern and at least one slot pattern, said patterns being partly superposed.

8. The optical detector according to claim 7, wherein the at least one pinhole pattern has a diameter approximately twice greater than a width of the at least one slot pattern, said width being taken in a direction normal to a tangent to the slot at a point in question.

9. The optical detector according to claim 7 wherein the at least one slot pattern is straight or curved.

10. The optical detector according to claim 1 wherein the optical passage zone comprises a plurality of pinhole patterns.

11. The optical detector according to claim 1, wherein the optical passage zone comprises at least one curved slot pattern having a curvature directed towards a centre of the reticle.

12. The optical detector according to claim 1, wherein the optical passage zone comprises at least one curved slot pattern having a curvature directed towards a periphery of the reticle, said slot pattern forming a closed contour.

13. The optical detector according to claim 1, wherein the dimension $a \geq 10 \cdot L_{pix} \cdot (Z/(Z+Z_p))$ where $Z_p$ is a minimum distance separating the useful detection volume from at least one of said optical passage and blocking zones and $L_{pix}$ is a pitch between two adjacent photodetectors of the retina.

14. The optical detector according to claim 1, wherein the at least one optical passage zone has a passage surface Sa of less than 50% of a total surface of the reticle.

15. The optical detector according to claim 1 wherein the angular resolution $\delta\theta$ is of the order of 2°.

16. The optical detector according to claim 1, wherein the distances Z and Zp are such that $0.2 \cdot Z \leq Z_p \leq 2 \cdot Z$ where $Z_p$ is a minimum distance separating the useful detection volume from at least one of said optical passage and blocking zones.

17. The optical detector according to claim 1, wherein the useful detection volume is comprised in an angle FOV=atan(L/2z) where L is a lateral dimension of the retina taken in a plane parallel to a face of the retina facing the reticle, said angle FOV having a top extending from the at least one optical passage and an axis of symmetry parallel to the optical axis, and said angle FOV defining a field of view of the optical detector.

18. The optical detector according to claim 1, further comprising at least one fluidic channel configured to guide the particles towards the useful detection volume, the at least one channel passing through the reticle at an orifice formed in the reticle.

19. The optical detector according to claim 18, wherein the at least one optical passage zone comprises a plurality of optical passage zones distributed around the orifice.

20. The optical detector according to claim 19, wherein the plurality of optical passage zones comprises at least one first optical passage zone and at least one second optical passage zone located on either side of the orifice of the channel.

21. The optical detector according to claim 20, wherein said at least one first optical passage zone has a characteristic dimension at least twice less than a characteristic dimension of the at least one second optical passage zone.

22. The optical detector according to claim 21, wherein the plurality of photodetectors of the retina comprises at least one first zone of photodetectors configured to receive the first and second parts through the at least one first optical passage zone, and at least one second zone of photodetectors configured to receive the first and second parts through the at least one second optical passage zone, the first zone of photodetectors comprising photodetectors different from those of the second zone of photodetectors, the first zone of photodetectors comprising smaller and more numerous photodetectors than those of the second zone of photodetectors, and the second zone of photodetectors comprising more sensitive photodetectors than those of the first zone of photodetectors.

23. The optical detector according to claim 1 further comprising opaque walls connecting the reticle and the retina and forming at least one closed contour so as to define a dark room wherein the first and second parts propagate, said dark room being only optically open at the at least one optical passage zone of the reticle.

24. The optical detector according to claim 1 further comprising at least one first chromatic filter configured to filter the first and second scattered parts having a first wavelength, and at least one second chromatic filter configured to filter the first and second scattered parts having a second wavelength different from the first wavelength.

25. A system comprising an optical detector according to claim 1 and the at least one primary source.

26. The system according to claim 25, wherein the at least one primary source comprises a first primary source emitting first incident light rays having at least one first wavelength and a second primary source emitting second incident light rays having at least one second wavelength different from the first wavelength, said first and second primary sources having respectively first and second main emission directions configured to intersect within the useful detection volume.

27. The optical detector according to claim 1, wherein
   the first and second parts are directly scattered from particles to the optical passage zone of the reticle, and
   the first and second parts exiting the optical passage zone impinge directly on the retina.

28. The optical detector according to claim 1, wherein an angle between the first and second parts incident on the retina is equal to $\theta_{ij}$.

* * * * *